(12) United States Patent
Islam et al.

(10) Patent No.: US 12,186,918 B2
(45) Date of Patent: *Jan. 7, 2025

(54) METHOD AND CONTROL SYSTEM FOR AND UPDATING CAMERA CALIBRATION FOR ROBOT CONTROL

(71) Applicant: MUJIN, INC., Tokyo (JP)

(72) Inventors: Russell Islam, Tokyo (JP); Xutao Ye, Tokyo (JP); Rosen Diankov, Tokyo (JP)

(73) Assignee: MUJIN, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/162,455

(22) Filed: Jan. 31, 2023

(65) Prior Publication Data
US 2023/0182308 A1    Jun. 15, 2023

Related U.S. Application Data

(63) Continuation of application No. 16/749,365, filed on Jan. 22, 2020, now Pat. No. 11,571,816, which is a
(Continued)

(51) Int. Cl.
*B25J 13/08* (2006.01)
*B25J 9/16* (2006.01)
*G06T 7/80* (2017.01)

(52) U.S. Cl.
CPC ........... *B25J 9/1692* (2013.01); *B25J 9/1664* (2013.01); *B25J 9/1697* (2013.01); *G06T 7/80* (2017.01)

(58) Field of Classification Search
CPC ...... B25J 9/1692; B25J 9/1664; B25J 9/1697; G06T 7/80; G05B 2219/39044; G05B 2219/39045
See application file for complete search history.

(56) References Cited

U.S. PATENT DOCUMENTS

| | | | |
|---|---|---|---|
| 5,299,288 A | 3/1994 | Glassman et al. | |
| 5,740,328 A * | 4/1998 | Ravani | B25J 9/1692 901/33 |

(Continued)

FOREIGN PATENT DOCUMENTS

| | | |
|---|---|---|
| CN | 1727839 A | 2/2006 |
| CN | 102470529 A | 5/2012 |

(Continued)

OTHER PUBLICATIONS

Office Action issued Apr. 8, 2020 in Japanese Patent Application No. 2019-130804 (with English-language translation).
(Continued)

*Primary Examiner* — Dalena Tran
(74) *Attorney, Agent, or Firm* — MEDLER FERRO WOODHOUSE & MILLS PLLC

(57) ABSTRACT

A robot control system and a method for updating camera calibration is presented. The method comprises the robot control system performing a first camera calibration to determine camera calibration information, and outputting a first movement command based on the camera calibration information for a robot operation. The method further comprises outputting, after the first camera calibration, a second movement command to move a calibration pattern within a camera field of view, receiving one or more calibration images, and adding the one or more calibration images to a captured image set. The method further comprises performing a second camera calibration based on calibration images in the captured image set to determine updated camera calibration information, determining whether a deviation between the camera calibration information and the updated camera calibration information exceeds a defined threshold, and outputting a notification signal if the deviation exceeds the defined threshold.

20 Claims, 18 Drawing Sheets

Related U.S. Application Data continuation of application No. 16/383,389, filed on Apr. 12, 2019, now Pat. No. 10,576,636.

(56) References Cited

U.S. PATENT DOCUMENTS

| | | | |
|---|---|---|---|
| 8,442,790 B2 * | 5/2013 | Fukuba | G01D 18/008 702/85 |
| 9,061,421 B2 | 6/2015 | Trompeter | |
| 9,248,573 B2 | 2/2016 | Soe-Knudsen et al. | |
| 9,470,518 B2 | 10/2016 | Huang et al. | |
| 9,503,704 B2 | 11/2016 | Ando | |
| 9,549,781 B2 * | 1/2017 | He | A61B 17/00234 |
| 9,713,869 B2 | 7/2017 | Trompeter | |
| 9,857,869 B1 | 1/2018 | Doucette | |
| 10,350,755 B2 | 7/2019 | Wagner et al. | |
| 2005/0102060 A1 | 5/2005 | Watanabe et al. | |
| 2006/0023938 A1 | 2/2006 | Ban et al. | |
| 2012/0098958 A1 | 4/2012 | Metzler et al. | |
| 2018/0300901 A1 * | 10/2018 | Wakai | G06T 7/73 |
| 2018/0304466 A1 * | 10/2018 | Machino | B25J 9/1697 |
| 2018/0339174 A1 * | 11/2018 | Kilby | A61N 5/1043 |
| 2018/0339456 A1 * | 11/2018 | Czinger | B33Y 30/00 |
| 2019/0156478 A1 * | 5/2019 | Berlinger | A61B 34/10 |

FOREIGN PATENT DOCUMENTS

| | | |
|---|---|---|
| CN | 103209809 A | 7/2013 |
| CN | 104511900 A | 4/2015 |
| CN | 105773609 A | 7/2016 |
| CN | 110253629 A | 9/2019 |
| JP | 2005138223 A | 6/2005 |
| JP | 2006035384 A | 2/2006 |
| JP | 2010214479 A | 9/2010 |
| JP | 2014069272 A | 4/2014 |
| JP | 2018012184 A | 1/2018 |
| WO | 2017033247 A1 | 3/2017 |
| WO | 2018163450 A1 | 9/2018 |

OTHER PUBLICATIONS

Office Action issued Aug. 20, 2020 in Chinese Patent Application No. 202010044646.5 (with English-language translation).

Office Action issued Dec. 16, 2021 in corresponding Chinese Patent Application No. 201910523868.2 (with English translation).

* cited by examiner

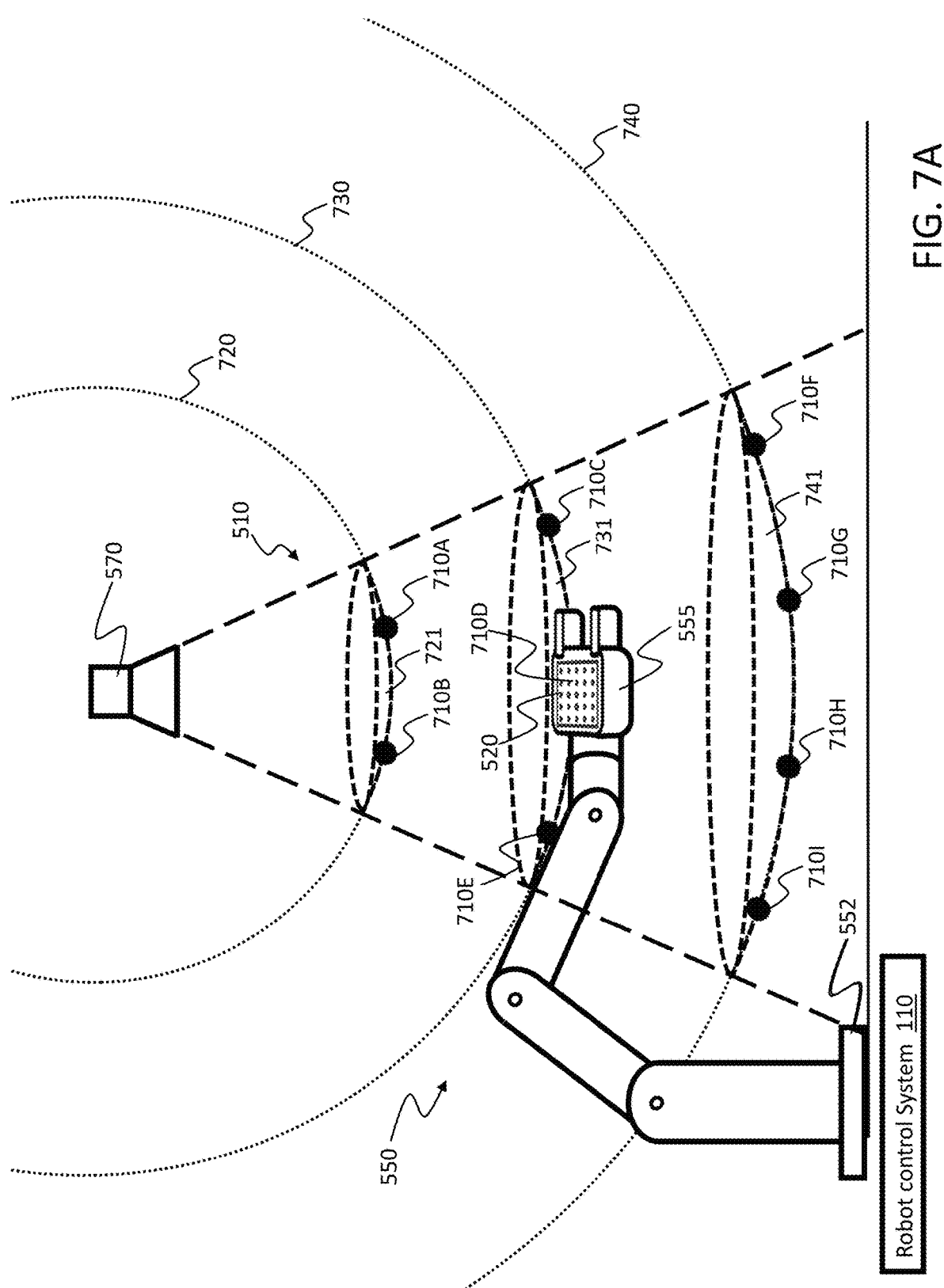

METHOD AND CONTROL SYSTEM FOR AND UPDATING CAMERA CALIBRATION FOR ROBOT CONTROL

CROSS-REFERENCE TO RELATED APPLICATIONS

This application is a continuation of U.S. patent application Ser. No. 16/749,365, titled "METHOD AND CONTROL SYSTEM FOR UPDATING CAMERA CALIBRATION FOR ROBOT CONTROL", and filed on Jan. 22, 2020, which is a continuation of U.S. patent application Ser. No. 16/383,389, titled "METHOD AND CONTROL SYSTEM FOR AND UPDATING CAMERA CALIBRATION FOR ROBOT CONTROL," and filed on Apr. 12, 2019, the entire content of which is incorporated herein by reference.

FIELD OF THE INVENTION

The present invention is directed to a method and control system for updating camera calibration for robot control.

BACKGROUND

As automation becomes more common, robots are being used in more environments, such as in warehousing and manufacturing environments. For instance, robots may be used to load items onto or off of a pallet in a warehouse, or to pick up objects from a conveyor belt in a factory. The movement of the robot may be fixed, or may be based on an input, such as an image taken by a camera in the warehouse or factory. In the latter situation, calibration may be performed so as to determine a property of the camera, and to determine a relationship between the camera and an environment in which the robot is located. The calibration may be referred to as camera calibration, and may generate camera calibration information that is used to control the robot based on images captured by the camera. In some implementations, the camera calibration may involve manual operation by a person, who may manually control movement of the robot, or manually control the camera to capture an image of the robot.

SUMMARY

One aspect of the embodiments herein relates to updating camera calibration for robot control. The camera calibration update may be performed by a robot control system that comprises a communication interface and a control circuit. The communication interface may be configured to communicate with a robot having a base and a robot arm with a calibration pattern disposed thereon, and to communicate with a camera having a camera field of view. The control circuit of the robot control system may be configured a) to perform a first camera calibration to determine camera calibration information b) to output a first movement command that is based on the camera calibration information to the robot via the communication interface to cause the robot arm to move to perform a robot operation, c) to output, after the first camera calibration, a second movement command to the robot via the communication interface to cause the robot arm to move the calibration pattern to one or more locations within the camera field of view, d) to receive one or more calibration images from the camera, wherein the one or more calibration images are respectively captured at the one or more locations within the camera field of view, e) to add the one or more calibration images to a captured image set which includes calibration images, f) to perform a second camera calibration based on the calibration images in the captured image set, wherein the second camera calibration outputs updated camera calibration information, g) to determine a deviation between the camera calibration information and the updated camera calibration information, h) to determine whether the deviation exceeds a defined threshold, and i) to output, in response to a determination that the deviation exceeds the defined threshold, a notification signal that indicates the deviation exceeds the defined threshold.

BRIEF DESCRIPTION OF THE DRAWINGS

The foregoing and other features, objects and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIGS. 7A and 7B depict examples of reference locations at which a calibration pattern is located when respective calibration images of the calibration pattern are captured, according to an embodiment herein.

DETAILED DESCRIPTION

Figure 1A:
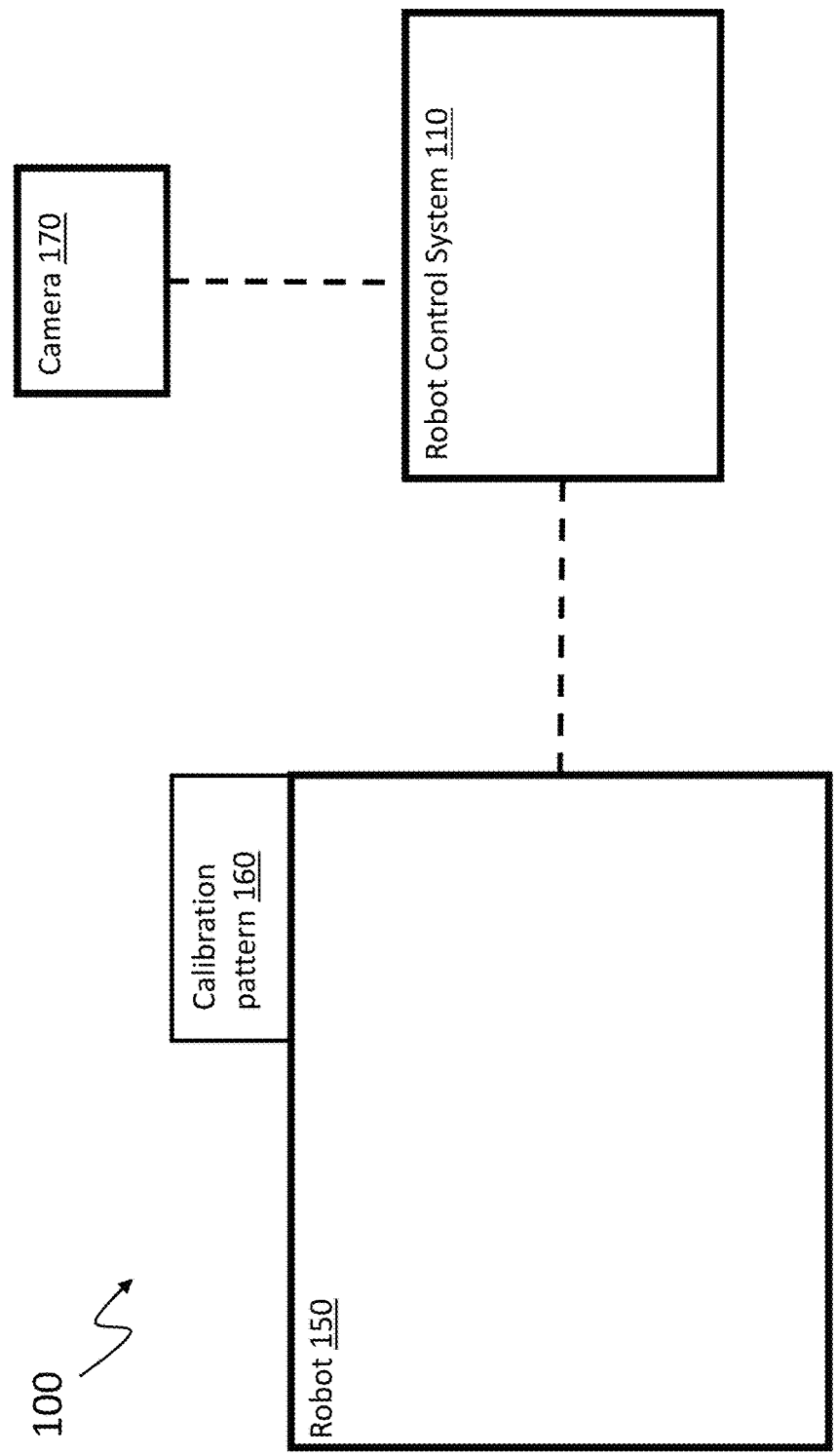
FIGS. 1A and 1B depict block diagrams of robot operation systems in which update of camera calibration is performed, according to embodiments herein.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments described herein relate to updating calibration of a camera used to control a robot, such as a robot used in a warehouse, a manufacturing plant, or in some other environment. The calibration may be referred to as camera calibration, and may be performed by, e.g., a robot control system (also referred to as a robot controller) to generate camera calibration information that facilitates an ability of the robot control system to control of the robot based on images captured (e.g., photographed) by the camera. For instance, the robot may be used to pick up a package in a warehouse, wherein placement of a robot arm or other component of the robot may be based on images of the package captured by the camera. In that instance, the camera calibration information may be used along with the images of the package to determine, for example, a location and orientation of the package relative to the robot arm of the robot. The camera calibration may involve, e.g., determining respective values of calibration parameters, such as respective estimates of intrinsic parameters of the camera (which may also be referred to as internal parameters), and/or an estimate of a relationship between the camera and its external environment. An intrinsic parameter of the camera may have one or more parameter values such as a matrix, a vector, or a scalar value. Further, examples of an intrinsic parameter include a projection matrix and a distortion parameter. In an instance, the camera calibration may involve determining the camera's position with respect to a fixed position in an external environment, which may be expressed as a transformation function representing the relationship between the camera and the fixed position in the external environment. In some cases, the camera calibration may be performed with the aid of a calibration pattern, which may have pattern elements disposed at defined locations on the calibration pattern. The camera may capture an image of the pattern elements of the calibration pattern (also referred to as a calibration image), and the camera calibration may be performed based on comparing an image of the pattern elements with the defined locations of the pattern elements. Camera calibration is discussed in more detail in U.S. application Ser. No. 16/295,940, filed on Mar. 7, 2019 and titled "METHOD AND DEVICE FOR PERFORMING AUTOMATIC CAMERA CALIBRATION TO CONTROL A ROBOT BASED ON IMAGES FROM A CAMERA", hereinafter referred to as "Application MJ0021US1", the entire content of which is incorporated herein by reference.

As stated above, one aspect of the present disclosure relates to updating a camera calibration that was performed at an earlier point in time so as to obtain camera calibration information that is still accurate at a later point in time. The camera calibration performed at the earlier point in time may generate camera calibration information that reflects a property of the camera at that earlier point in time, such as an intrinsic parameter of the camera or a relationship between the camera and its external environment at that point in time. In some cases, an earlier camera calibration may lose accuracy over time because the property of the camera may change over time. In a first example, an intrinsic parameter of the camera may change over time. Such a change may be caused by, e.g., a temperature change that alters a shape of a housing and/or a lens of the camera. In a second example, a relationship between the camera and its external environment may change over time. For instance, the camera may shift in position or orientation relative to, e.g., a base of the robot or a location in a warehouse. Such a change may be caused by, e.g., a temperature change that expands or contracts any component used to mount the camera, by a person or other object bumping into the camera, by a vibration in the camera's external environment (e.g., a warehouse), by a force from the camera's own weight (i.e., by gravity), or by some other factor. These changes may render the camera calibration information outdated as time progresses, and using this camera calibration information to position a robot arm or other component of the robot at a later point in time may lead to errors. In other words, if a property associated with the camera has changed over time but the camera calibration information is not updated to reflect such a change, the robot may operate based on outdated or otherwise incorrect camera calibration information, thereby causing undesirable errors in the robot's operation. To address the possibility that changes in one or more properties of the camera may occur, a robot control system may automatically determine updated camera calibration information based on more recent calibration images. In some cases, the robot control system may maintain a captured image set that acts as a sliding window identifying a certain number of the most recent calibration images, wherein the calibration images in the sliding window are used to update the camera calibration and to generate updated camera calibration information. In an embodiment, the updated camera calibration information may be used to perform a verification that detects a change in a property of the camera or a change in a relationship between the camera and its external environment. This change may be detected by, e.g., detecting a significant change in the calibration information over a short period of time. In some implementations, this detection may generate a notification signal if the property of the camera changes too quickly and/or too drastically. Such a change may in some cases reflect an undesirable condition in the camera or the camera's external environment. The notification signal may, e.g., be communicated to a user interface device (e.g., a laptop), which may alert a robot operator or other user of the potential existence of such an undesirable condition.

One aspect of the embodiments herein relates to updating a first camera calibration by performing a subsequent camera calibration (also referred to as a later camera calibration) based on more recently captured calibration images, which may be images of a calibration pattern. In some cases, the subsequent camera calibration may be performed if a sufficient number of calibration images that are more recent than the first camera calibration have been captured by a camera. For instance, the number of calibration images may have to reach a target count before the subsequent camera calibration is performed. The target count may be a defined value that was provided to the robot control system, or may be a defined value that is dynamically determined by the robot control system. In some cases, the subsequent camera calibration may use a captured image set that retains a defined number of the most recently captured images. In such cases, the captured image set, which may be stored on the robot control system or elsewhere, may act as a sliding window that adds the most recently captured calibration images and discards an equal number of the oldest calibration images, so that the subsequent camera calibration uses a defined number of the most recently captured calibration images, so as to provide updated camera calibration information.

In an embodiment, detecting a change in a property of the camera or in its external environment may be performed by comparing camera calibration information from the first camera calibration with camera calibration information from the subsequent camera calibration. The comparison may be performed by, e.g., a robot control system (also referred to as a robot controller), which may output a notification signal when camera calibration information from the subsequent camera calibration deviates from camera calibration information of the first camera calibration by an undesirable amount, and/or at an undesirable rate. In some cases, the first camera calibration may be an initial camera calibration performed before beginning a robot operation to determine camera calibration information for the camera. In an instance, the first camera calibration may be performed by controlling the robot to move the calibration pattern to reference locations within the camera's field of view (also referred to as a camera field of view of the camera) via an initial movement command, capturing initial calibration images of the calibration pattern at respective reference locations, and performing the first camera calibration based on the initial calibration images. The locations of the reference locations may be randomly selected or may be defined (e.g., defined manually, or dynamically calculated by the robot control system).

After the first camera calibration, the robot may perform the robot operation by moving the robot based on the camera calibration information determined from the first camera calibration. During the robot operation, more calibration images are captured by the camera at respective locations within the camera field of view and added to the captured image set. As stated above, the subsequent camera calibration may in some cases be performed only when a total number of calibration images in the captured image set has reached a defined target count, which may indicate that a sufficient number of recent calibration images are available for reliable camera calibration. In some cases, the target count may indicate a minimum number of calibration images for reliably updating the camera calibration. In an embodiment, after the robot control system performs an initial camera calibration, or more generally a first camera calibration, the robot control system may subsequently receive calibration images and place them in a captured image set. The calibration images in the captured image set may thus be used to perform a subsequent camera calibration, or more generally a second camera calibration, which outputs updated camera calibration information. In an embodiment, an amount of deviation between the camera calibration information from the first camera calibration and the updated camera calibration information from the second camera calibration may be determined. If the amount of deviation exceeds a defined threshold, a notification signal is output to indicate that the amount of deviation exceeds the defined threshold (which may also be referred to as a deviation threshold). In an embodiment, the amount of deviation exceeding the defined threshold may indicate that the robot operation may not be reliably performed, and/or that an operator or other user needs to be notified. Thus, if the amount of deviation exceeds a defined threshold, the robot operation may be stopped or paused, to prevent undesirable errors in robot tasks during the robot operation, and/or a notification may be output to a user interface device. On the other hand, if the amount of deviation does not exceed the defined threshold, the robot operation may be continued, while capturing new calibration images of the calibration pattern.

Depending on the robot's characteristics or configurations, the calibration images may be captured only during an idle period of a robot operation, or may be captured without the use of an idle period (e.g., during a period in which the robot is picking up objects). In an embodiment, the idle period may be a time period during which the robot is free from a robot task during the robot operation. In one example, an idle period may be used for situations in which a calibration pattern is disposed on a portion of the robot that does not regularly face the camera while a robot task is being performed. In such an example, the idle period may be utilized to move the calibration pattern to face the camera and capture the calibration pattern via the camera. In another example, an idle period may be skipped for situations in which the calibration pattern may be, e.g., disposed on a portion of the robot that may regularly face the camera while the robot is performing a robot task.

In an embodiment, if the calibration images are to be captured only during an idle period, the second camera calibration may also be completed only during an idle period. Completing the second camera calibration may involve, e.g., performing calculations to determine intrinsic parameters based on the calibration images, and/or to determine transformation functions based on the calibration images that relate the camera to its external environment, as discussed in more detail in U.S. application Ser. No. 16/295,940, filed on Mar. 7, 2019 and titled "METHOD AND DEVICE FOR PERFORMING AUTOMATIC CAMERA CALIBRATION TO CONTROL A ROBOT BASED ON IMAGES FROM A CAMERA", the entire content of which is incorporated herein by reference. In some instances, the calculations or other steps for completing the second camera calibration may be performed only during an idle period that is at least as long as a defined calibration time period. The defined calibration time period may indicate a time necessary to complete the second camera calibration (e.g., a time necessary to perform the calculations). If an amount of time in the idle period is shorter than the defined calibration time period, then the calculations or other steps involved in completing the second camera calibration may be postponed to a subsequent idle period. In some cases, if the calculations are postponed to a subsequent idle period, a current idle period may still be used to control the camera to capture more calibration images, so that when the calculations are performed in the subsequent time period, they are performed with more recently captured calibration images from the current idle period.

FIG. 1A illustrates a block diagram of a robot operation system 100 (also referred to as a system 100) for performing automatic camera calibration and automatic update of the camera calibration. The robot operation system 100 includes a robot 150, a robot control system 110 (also referred to as a robot controller), and a camera 170. In an embodiment, the system 100 may be located within a warehouse, a manufacturing plant, or other premises. The robot control system 110 may be configured to perform camera calibration, which is discussed in more detail below, to determine camera calibration information that is later used to control the robot 150 to perform a robot operation, such as picking up packages in the warehouse. The robot control system 110 may further be configured to update camera calibration, which is also discussed in more detail below, and to detect a situation in which camera calibration information is changing too much or too quickly, which may indicate an undesirable condition in the camera 170 or in its external environment. In some cases, the robot control system 110 is configured to perform the camera calibration and to control the robot 150 to perform robot operation based on the camera calibration information. In some cases, the robot control system 110 may form a single device (e.g., a single console or a single computer) that communicates with the robot 150 and the camera 170. In some cases, the robot control system 110 may include multiple devices.

In some cases, the robot control system 110 may be dedicated to performing the camera calibration and/or update of the camera calibration, and may communicate the most current camera calibration information to another control system (also referred to as another controller, not shown) that then controls the robot 150 to perform a robot operation based on the most current camera calibration information. The robot 150 may be positioned based on images captured by the camera 170 and on the camera calibration information. More specifically, the robot control system 110 may, in an embodiment, be configured to generate movement commands based on the images and based on the camera calibration information, and to communicate the movement commands to the robot 150 to control movement of its robot arm. In some cases, the robot control system 110 is configured to perform an update of the camera calibration during an idle period in the robot operation. In some cases, the robot control system 110 is configured to perform the update while performing a robot operation with the robot 150.

In an embodiment, the robot control system 110 may be configured to communicate via a wired or wireless communication with the robot 150 and the camera 170. For instance, the robot control system 110 may be configured to communicate with the robot 150 and/or the camera 170 via a RS-232 interface, a universal serial bus (USB) interface, an Ethernet interface, a Bluetooth® interface, an IEEE 802.11 interface, or any combination thereof. In an embodiment, the robot control system 110 may be configured to communicate with the robot 150 and/or the camera 170 via a local computer bus, such as a peripheral component interconnect (PCI) bus.

In an embodiment, the robot control system 110 may be separate from the robot 150, and may communicate with the robot via the wireless or wired connection discussed above. For instance, the robot control system 110 may be a stand-alone computer that is configured to communicate with the robot 150 and the camera 170 via a wired connection or wireless connection. In an embodiment, the robot control system 110 may be an integral component of the robot 150, and may communicate with other components of the robot 150 via the local computer bus discussed above. In some cases, the robot control system 110 may be a dedicated control system (also referred to as a dedicated controller) that controls only the robot 150. In other cases, the robot control system 110 may be configured to control multiple robots, including the robot 150. In an embodiment, the robot control system 110, the robot 150, and the camera 170 are located at the same premises (e.g., warehouse). In an embodiment, the robot control system 110 may be remote from the robot 150 and the camera 170, and may be configured to communicate with the robot 150 and the camera 170 via a network connection (e.g., local area network (LAN) connection).

In an embodiment, the robot control system 110 may be configured to retrieve or otherwise receive images of a calibration pattern 160 disposed on the robot 150 (e.g., on a robot arm of the robot) from the camera 170. In some instances, the robot control system 110 may be configured to control the camera 170 to capture such images. For example, the robot control system 110 may be configured to generate a camera command that causes the camera 170 to capture an image of a field of view of the camera 170 (also referred to as a camera field of view), and to communicate the camera command to the camera 170 via the wired or wireless connection. The same command may cause the camera 170 to also communicate the image to the robot control system 110, or more generally to a storage device accessible by the robot control system 110. Alternatively, the robot control system 110 may generate another camera command that causes the camera 170, upon receiving the camera command, to communicate an image(s) it has captured to the robot control system 110. In an embodiment, the camera 170 may automatically capture an image in its camera field of view, either periodically or in response to a defined triggering condition, without needing a camera command from the robot control system 110. In such an embodiment, the camera 170 may also be configured to automatically, without a camera command from the robot control system 110, communicate the image to the robot control system 110 or, more generally, to a storage device accessible by the robot control system 110.

In an embodiment, the robot control system 110 may be configured to control movement of the robot 150 via movement commands that are generated by the robot control system 110 and communicated over the wired or wireless connection to the robot 150. The robot 150 may be configured to have the calibration pattern 160 on the robot 150. For example, the calibration pattern 160 may be permanently disposed on the robot 150, or may be a separate component that can be attached to and detached from the robot 150.

In an embodiment, the only images used in the system 100 to control the robot 150 may be those captured by the camera 170. In another embodiment, the system 100 may include multiple cameras, and the robot 150 may be controlled by images from the multiple cameras.

Figure 1B:
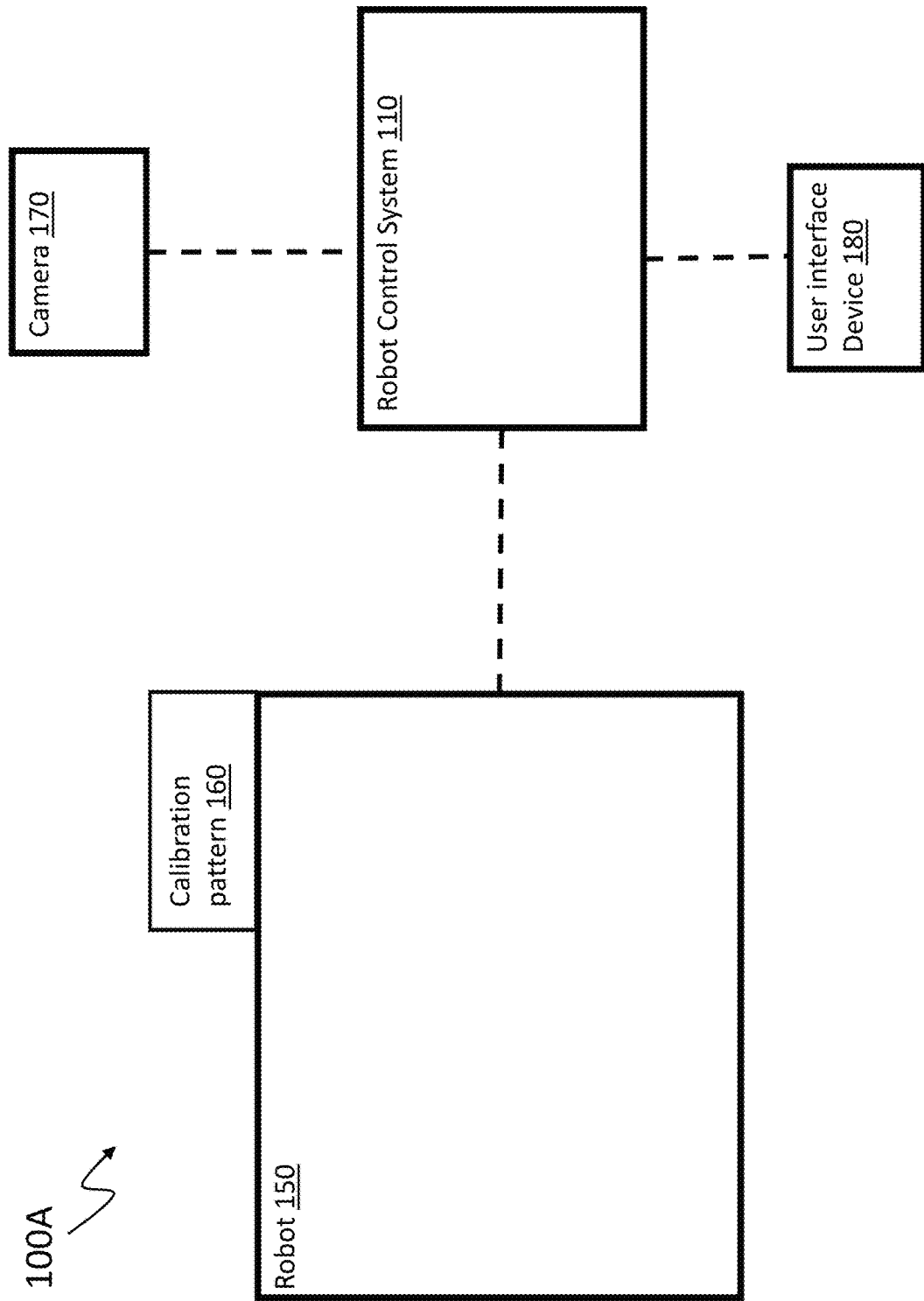

FIG. 1B illustrates a robot operation system 100A that includes the robot 150, the robot control system 110, the camera 170, and a user interface device 180. The robot 150 may have the calibration pattern disposed on the robot 150. In some cases, the robot operation system 100A may perform an initial camera calibration, or more generally a first camera calibration, to obtain initial camera calibration information, which may act as baseline camera calibration information. The robot operation system 100A may subsequently perform additional camera calibrations over time to obtain updated camera calibration information. The robot operation system 100A may monitor whether an amount of deviation between the updated camera calibration information and the baseline camera calibration information exceeds a defined threshold. If the amount of deviation is determined to exceed the defined threshold during the robot operation, then the robot control system 110 may output a notification signal to the user interface device 180. The user interface device 180 may be configured to interface with an operator of the robot 150, such as an employee at a warehouse in which the robot 150 is located. The user interface device 180 may include, e.g., a tablet computer or desktop computer that provides a user interface displaying information relating to operation of the robot 150. In an instance, the user interface device 180 may provide an alarm or other alert to notify the operator of the amount of deviation exceeding the defined threshold. The notification signal may reflect, e.g., an undesirable condition in which a property of the camera 170 is changing too much or too quickly, or in which a relationship between the camera 170 and the robot 150 is changing too much or too quickly.

Figure 1C:
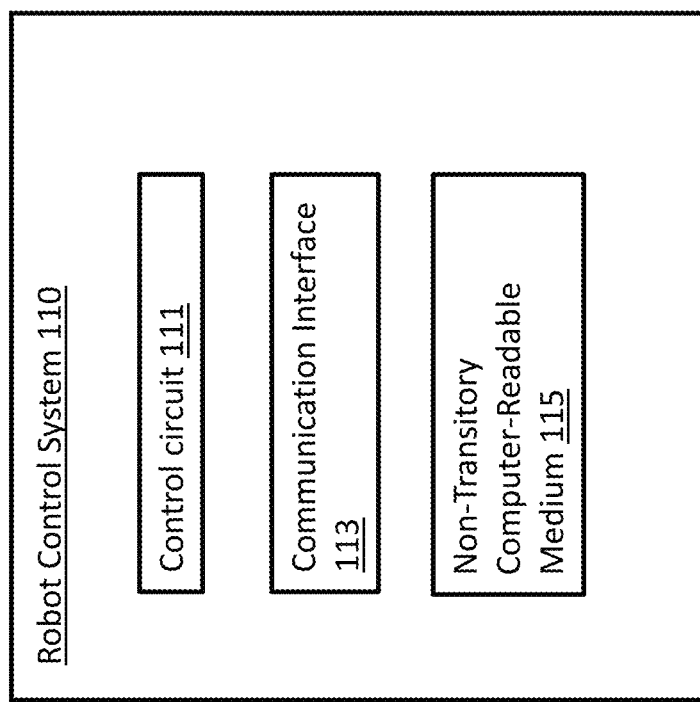
FIG. 1C depicts a block diagram of a robot control system configured to perform update of camera calibration, according to an embodiment herein.

FIG. 1C depicts a block diagram of the robot control system 110. As illustrated in the block diagram, the robot control system 110 includes a control circuit 111, a communication interface 113, and a non-transitory computer-readable medium 115 (e.g., memory). In an embodiment, the control circuit 111 may include one or more processors, a programmable logic circuit (PLC) or a programmable logic array (PLA), a field programmable gate array (FPGA), an application specific integrated circuit (ASIC), or any other control circuit.

In an embodiment, the communication interface 113 may include one or more components that are configured to communicate with the camera 170 of FIG. 1A or 1B and the robot 150 of FIG. 1A or 1B. For instance, the communication interface 113 may include a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof.

In an embodiment, the non-transitory computer-readable medium 115 may include computer memory. The computer memory may comprise, e.g., dynamic random access memory (DRAM), solid state integrated memory, and/or a hard disk drive (HDD). In some cases, the camera calibration may be implemented through computer-executable instructions (e.g., computer code) stored on the non-transitory computer-readable medium 115. In such cases, the control circuit 111 may include one or more processors configured to perform the computer-executable instructions to perform updating of camera calibration (e.g., the steps illustrated in FIGS. 4A, 4B, 9, and 11).

Figure 1D:
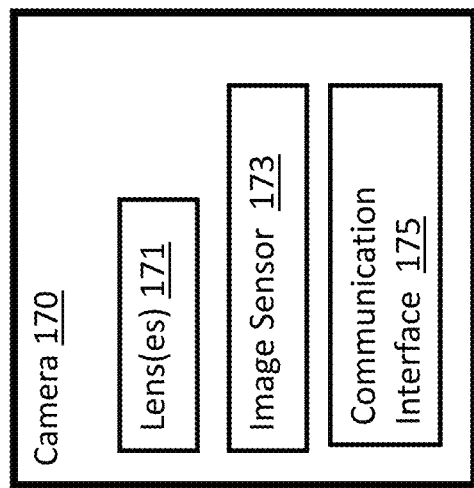
FIG. 1D depicts a block diagram of a camera for which camera calibration is performed, according to an embodiment herein.

FIG. 1D depicts a block diagram of the camera 170 that includes one or more lenses 171, an image sensor 173, and a communication interface 175. The communication interface 175 may be configured to communicate with the robot control system 110 of FIG. 1A, 1, or 1C, and may be similar to the communication interface 113 of FIG. 1C of the robot control system 110. In an embodiment, the one or more lenses 171 may focus light that is coming from outside the camera 170 onto the image sensor 173. In an embodiment, the image sensor 173 may include an array of pixels configured to represent an image via respective pixel intensity values. The image sensor 173 may include a charge-coupled device (CCD) sensor, a complementary metal oxide semiconductor (CMOS) sensor, a quanta image sensor (QIS), or any other image sensor.

Figure 2:
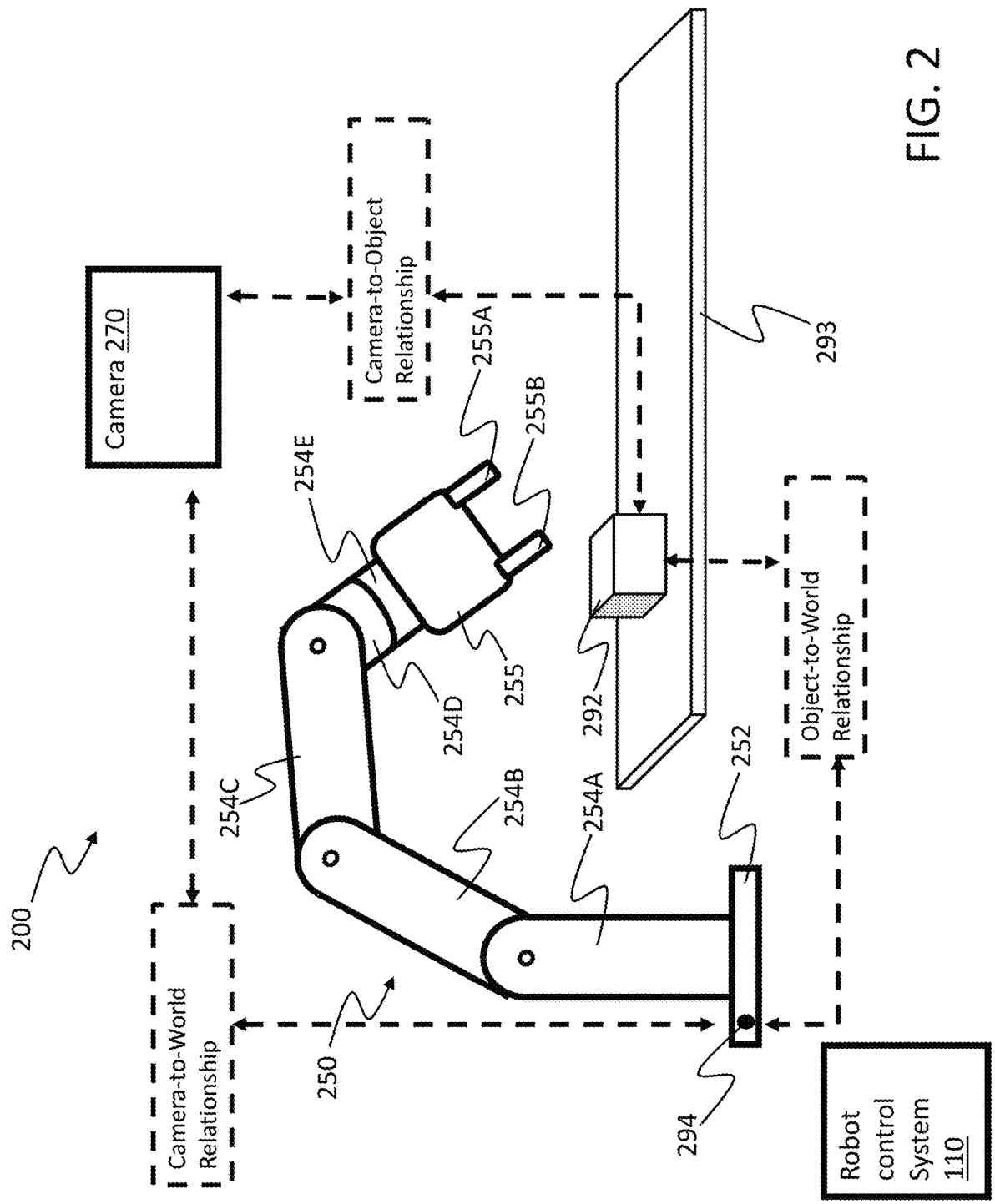
FIG. 2 depicts a robot operation system that illustrates a robot being controlled based on camera calibration information obtained from camera calibration, according to an embodiment herein.

As stated above, the camera calibration may be performed in order to facilitate the control of a robot based on images captured by a camera. For instance, FIG. 2 depicts a robot operation system 200 (also referred to as the system 200) in which the images are used to control a robot 250 to perform a robot operation, such as an operation to pick up an object 292 in a warehouse. More specifically, the system 200 may be an embodiment of system 100 of FIG. 1A, and includes a camera 270, the robot 250, and the robot control system 110. The camera 270 may be an embodiment of the camera 170 of FIG. 1A, 1B, or 1D, and the robot 250 may be an embodiment of the robot 150 of FIG. 1A or 1B. The camera 270 may be configured to capture an image of the object 292 (e.g., a package for shipping) disposed on a conveyor belt 293 in the warehouse, and the robot control system 110 may be configured to control the robot 250 to pick up the object 292. When there are one or more objects on the conveyor belt 293, the robot control system 110 may be configured to schedule movement of the robot 250 to pickup the objects. The robot control system 110 may in some cases be configured to detect an idle period for the robot operation by detecting when there are no objects on the conveyor belt 293, or when there are no objects on the conveyor belt 293 that are within reach of the robot 250.

In the embodiment of FIG. 2, the robot 250 may have a base 252 and a robot arm that is movable relative to the base 252. More specifically, the robot arm may comprise a plurality of links 254A through 254E, and a robot hand 255 attached to the link 254E. The plurality of links 254A through 254E may be rotatable relative to each other, and/or may be prismatic links that are movable linearly with respect to each other. Because FIG. 2 involves the robot 250 that is used to pick up objects, the robot hand 255 may include grippers 255A and 255B used to grab the object 292. In an embodiment, the robot control system 110 may be configured to communicate a movement command to rotate one or more of the links 254A through 254E. The movement command may be a low-level command, such as motor movement commands, or a high-level command. If the movement command from the robot control system 110 is a high-level command, the robot 150 may be configured to convert the high-level command to a low-level command.

In an embodiment, the camera calibration information determined from the camera calibration describes a relationship between the camera 270 and the robot 250, or more specifically a relationship between the camera 270 and a world point 294 that is stationary relative to the base 252 of the robot 250. The world point 294 may represent a world or other environment in which the robot 250 is located, and may be any imaginary point that is stationary relative to the base 252. In other words, the camera calibration information may include information describing a relationship between the camera 270 and the world point 294. In an embodiment, this relationship may refer to a location of the camera 270 relative to the world point 294, as well as an orientation of the camera 270 relative to a reference orientation for the robot 250. The above relationship between the camera 270 and the world point 294 may be referred to as a camera-to-world relationship, and may be used to represent a relationship between the camera 270 and the robot 250. In some cases, the camera-to-world relationship may be used to determine a relationship between the camera 270 and the object 292 (also referred to as a camera-to-object relationship), and a relationship between the object 292 and the world point 294 (also referred to as an object-to-world relationship). The camera-to-object relationship and the object-to-world relationship may be used to control the robot 250 to pick up the object 292.

In an embodiment, the camera calibration information may describe an intrinsic parameter of the camera 270, where the intrinsic parameter may be any parameter whose value is independent of a location and an orientation of the camera 270. The intrinsic parameters may characterize a property of the camera 270, such as its focal length, a size of its image sensor, or an effect of lens distortion introduced by the camera 270.

Figure 3:
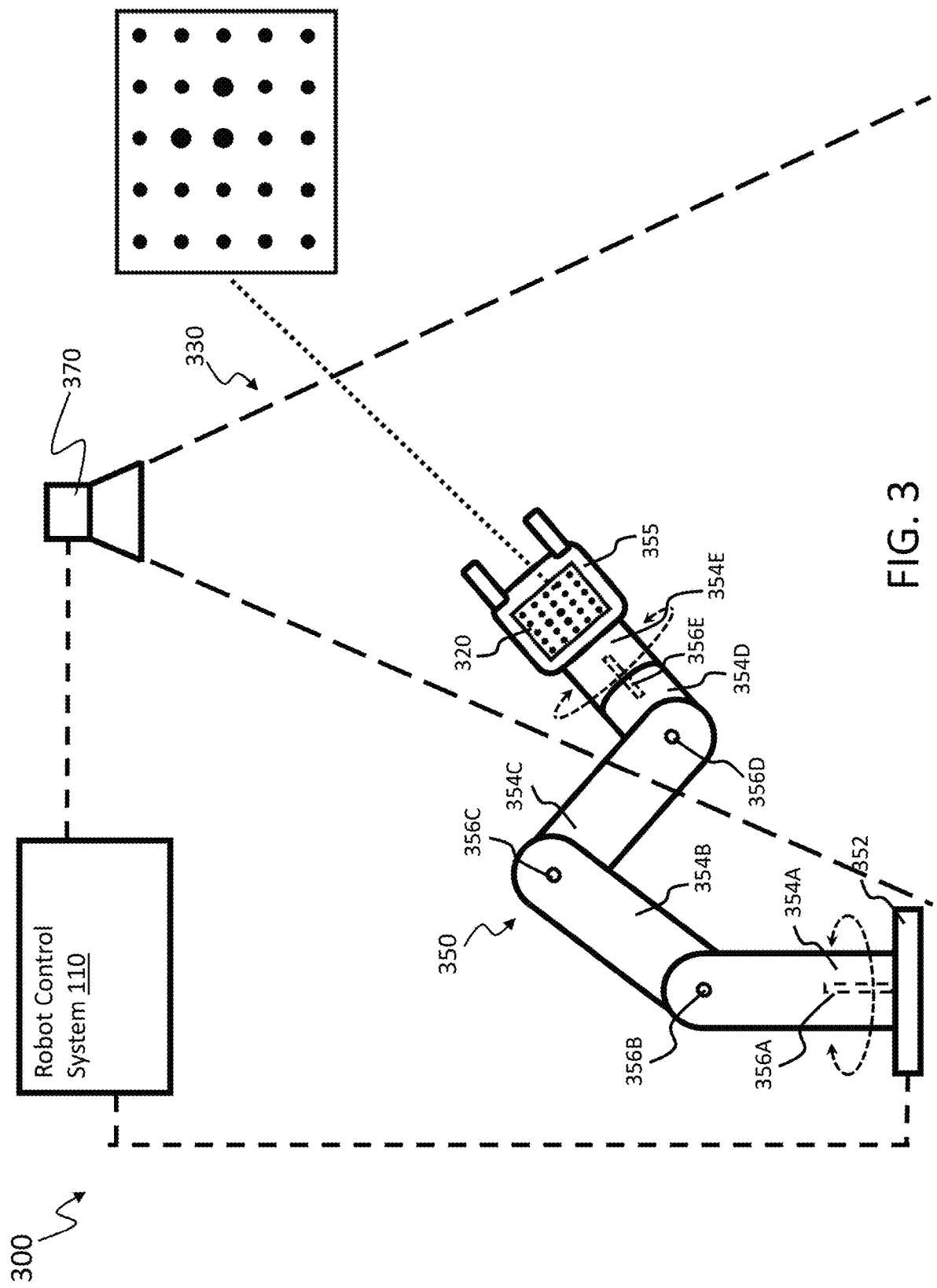
FIG. 3 depicts a robot operation system for performing camera calibration, according to an embodiment herein.

An example showing a detailed structure of an example robot 350 is depicted in FIG. 3, which depicts a robot operation system 300 that includes the robot control system 110 in communication with a camera 370 and the robot 350. The camera 370 may be an embodiment of the camera 170/270 of FIG. 1A, 1B, 1D, or 2, respectively, and the robot 350 may be an embodiment of the robot 150/250 of FIG. 1A, 1B, or 2 respectively. The camera 370 may be capable of capturing images (e.g., calibration images) within a field of view of the camera 370, which may also be referred to as a camera field of view 330. The robot 350 may include a base 352 and a robot arm movable relative to the base 352. The robot arm includes one or more links, such as links 354A through link 354E. In an embodiment, the links 354A-354E may be rotatably attached to each other. For instance, the link 354A may be rotatably attached to the robot base 352 via a joint 356A. The remaining links 354B through 354E may be rotatably attached to each other via joints 356B through 356E. In an embodiment, the base 352 may be used to mount the robot 350 to, e.g., a mounting frame or mounting surface (e.g., floor of a warehouse). In an embodiment, the robot 350 may include a plurality of motors that are configured to move the robot arm by rotating the links 354A-354E. For instance, one of the motors may be configured to rotate the first link 354A with respect to the joint 356A and the base 302, as shown with the dotted arrow in FIG. 3. Similarly, other motors of the plurality of motors may be configured to rotate the links 354B through 354E. The plurality of motors may be controlled by the robot control system 110. FIG. 3 further depicts the robot hand 355 disposed in a fixed manner on the fifth link 354E. The robot hand 355 may have a calibration pattern 320 thereon, such that the robot control system 110 may capture images of the calibration pattern 320 via the camera 370 and perform camera calibration based on the captured images of the calibration pattern 320. For example, the robot control system 110 may move the robot arm such that the calibration pattern 320 may be within the camera field of view 330 and visible to the camera 370 when capturing the images of the calibration pattern 320. The robot hand 355 may be removable and replaceable with another robot hand.

As stated above, one aspect of the present application relates to continuing to capture images of the calibration pattern (which may be referred to as calibration images) after a first camera calibration (e.g., an initial camera calibration), and performing an additional camera calibration (e.g., a subsequent camera calibration) based on the more recently captured calibration images. In some cases, the more recently captured calibration images may be added to a captured image set, which may act as a sliding window that maps to a defined number of the most recently captured calibration images, so that the additional camera calibration may be based on the defined number of most recently captured calibration images.

Figure 4A:
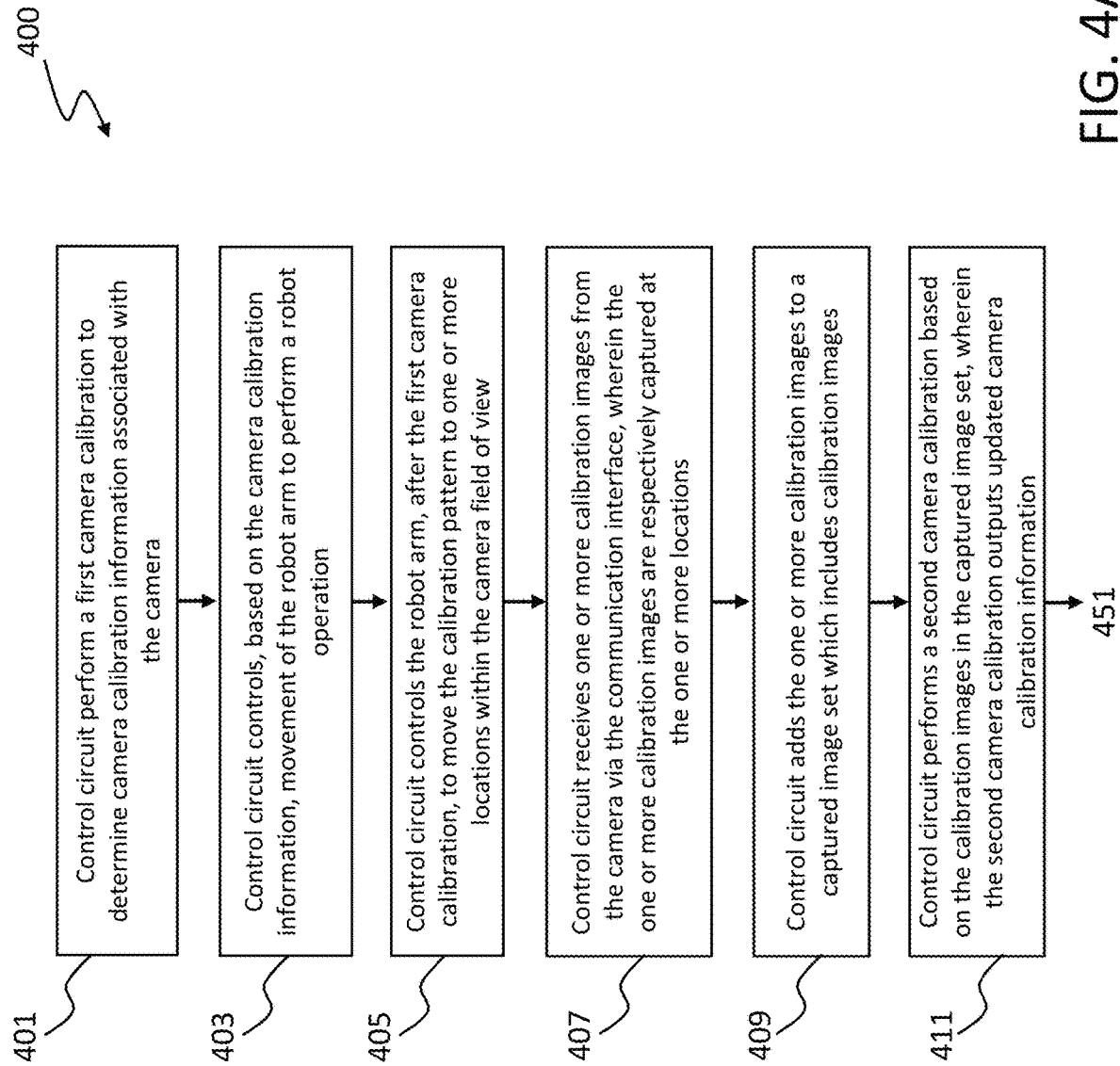
FIGS. 4A and 4B provide a flow diagram that illustrates an example method for performing and updating camera calibration, according to an embodiment hereof.
Figure 4B:
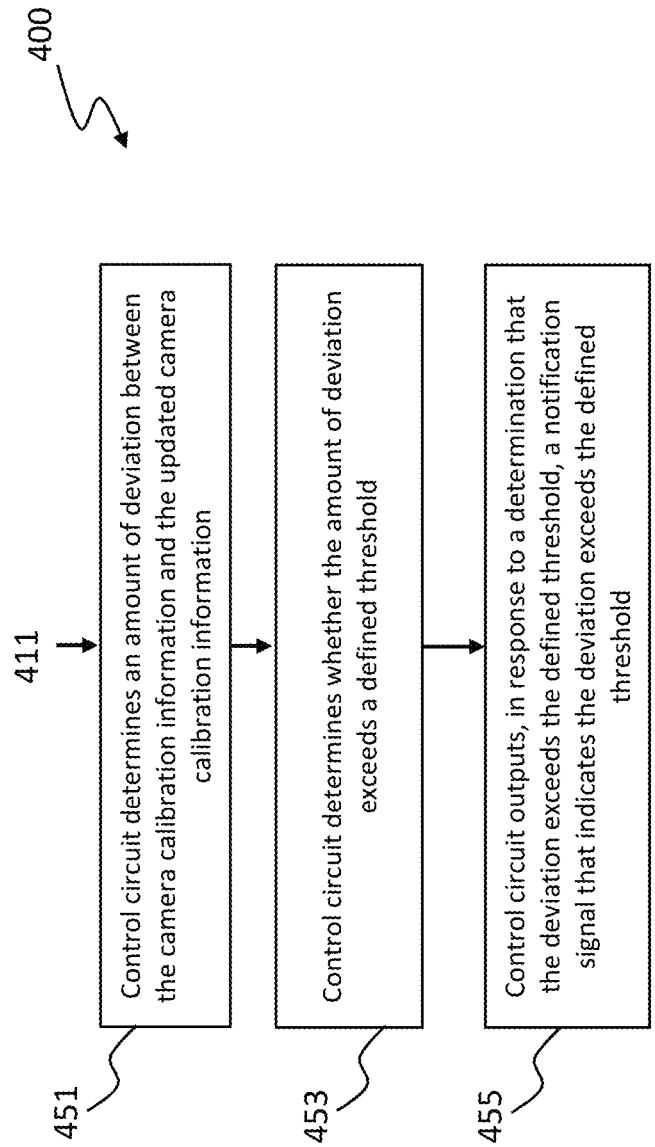

FIGS. 4A and 4B provide a flow diagram that depicts example steps of a method 400 for updating camera calibration. In an embodiment, the method 400 may be performed by the control circuit 111 of FIG. 1C of the robot control system 110 of FIG. 1A, 1, or 1C. As stated above, the robot control system 110 may include the control circuit 111 and the communication interface 113 of FIG. 1C, which is configured to communicate with the robot 150 of FIG. 1A or 1B, and the camera 170 of FIG. 1A, 1B, or 1D, which has a camera field of view. The robot 150 may have a base (e.g. the base 252 of FIG. 2 or the base 352 of FIG. 3) and a robot arm (e.g. the robot arm of FIG. 2 or FIG. 3) movable relative to the base, and the robot arm may have a calibration pattern (e.g. the calibration pattern 160 of FIG. 1A or 1B or the calibration pattern 320 of FIG. 3) disposed thereon.

In an embodiment, method 400 may begin with step 401, in which the control circuit 111 performs a first camera calibration to determine camera calibration information for the camera (e.g., 170). The control circuit 111 may perform the first camera calibration based on images of a calibration pattern (also referred to as calibration images). In an aspect, the first camera calibration may be performed by: controlling the robot arm to move the calibration pattern to a first set of one or more locations within the camera field of view, receiving a first set of one or more calibration images from the camera (e.g., camera 170) via the communication interface (e.g., communication interface 113), where the camera (e.g., 170) is configured to capture the first set of one or more calibration images while the calibration pattern is or was at the first set of one or more locations, respectively, and performing the first camera calibration based on the first set of one or more calibration images. The first set of one or more locations may be randomly selected or may be defined (e.g., defined manually, or dynamically calculated by the robot control system). Camera calibration is discussed in more detail in in U.S. application Ser. No. 16/295,940, filed on Mar. 7, 2019 and titled "METHOD AND DEVICE FOR PERFORMING AUTOMATIC CAMERA CALIBRATION TO CONTROL A ROBOT BASED ON IMAGES FROM A CAMERA", the entire content of which is incorporated herein by reference.

Figure 5A:
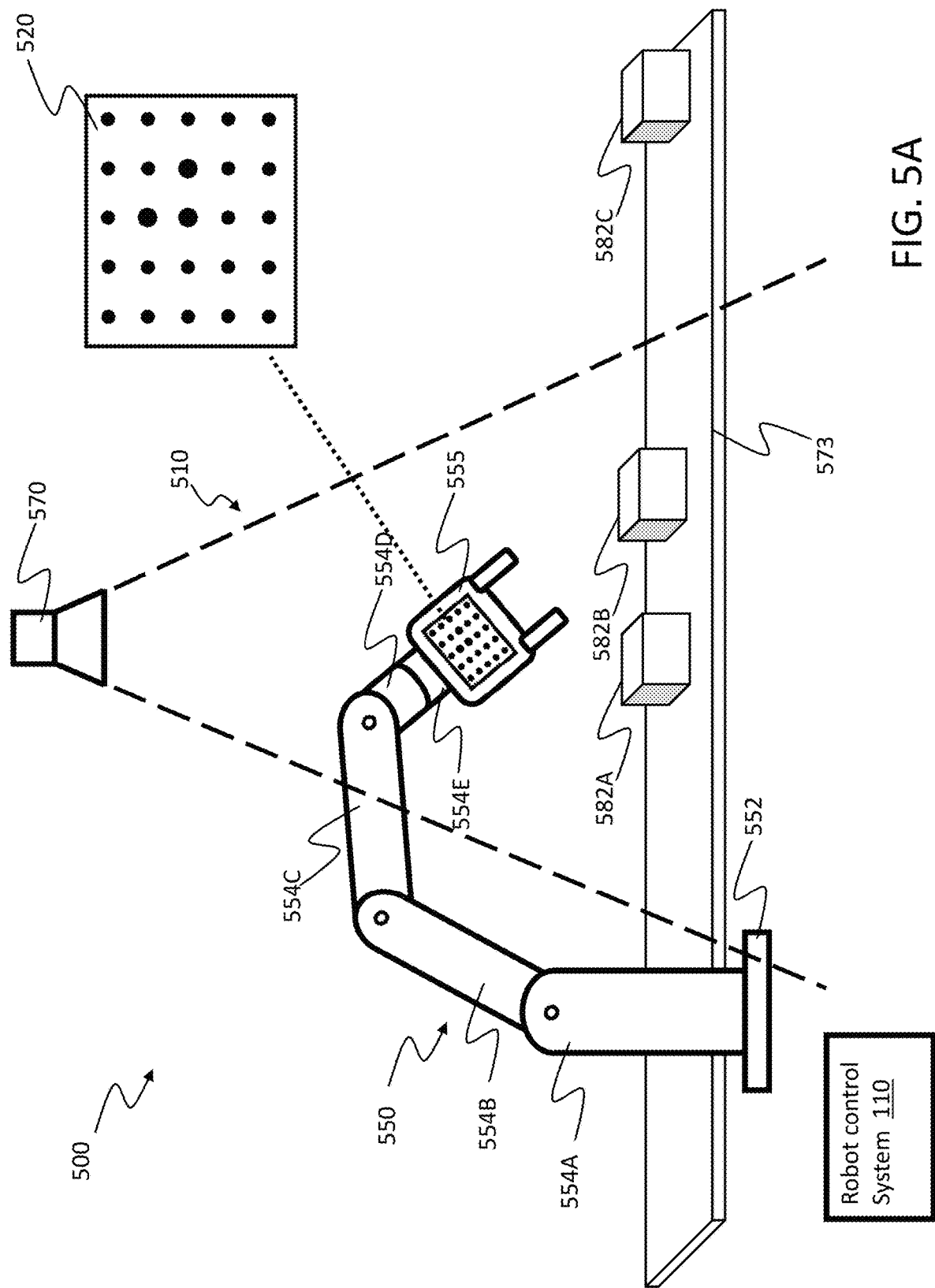
FIGS. 5A and 5B depict an example robot operation system for performing and updating camera calibration, in which the camera calibration is performed during an idle period, according to an embodiment hereof.
Figure 5B:
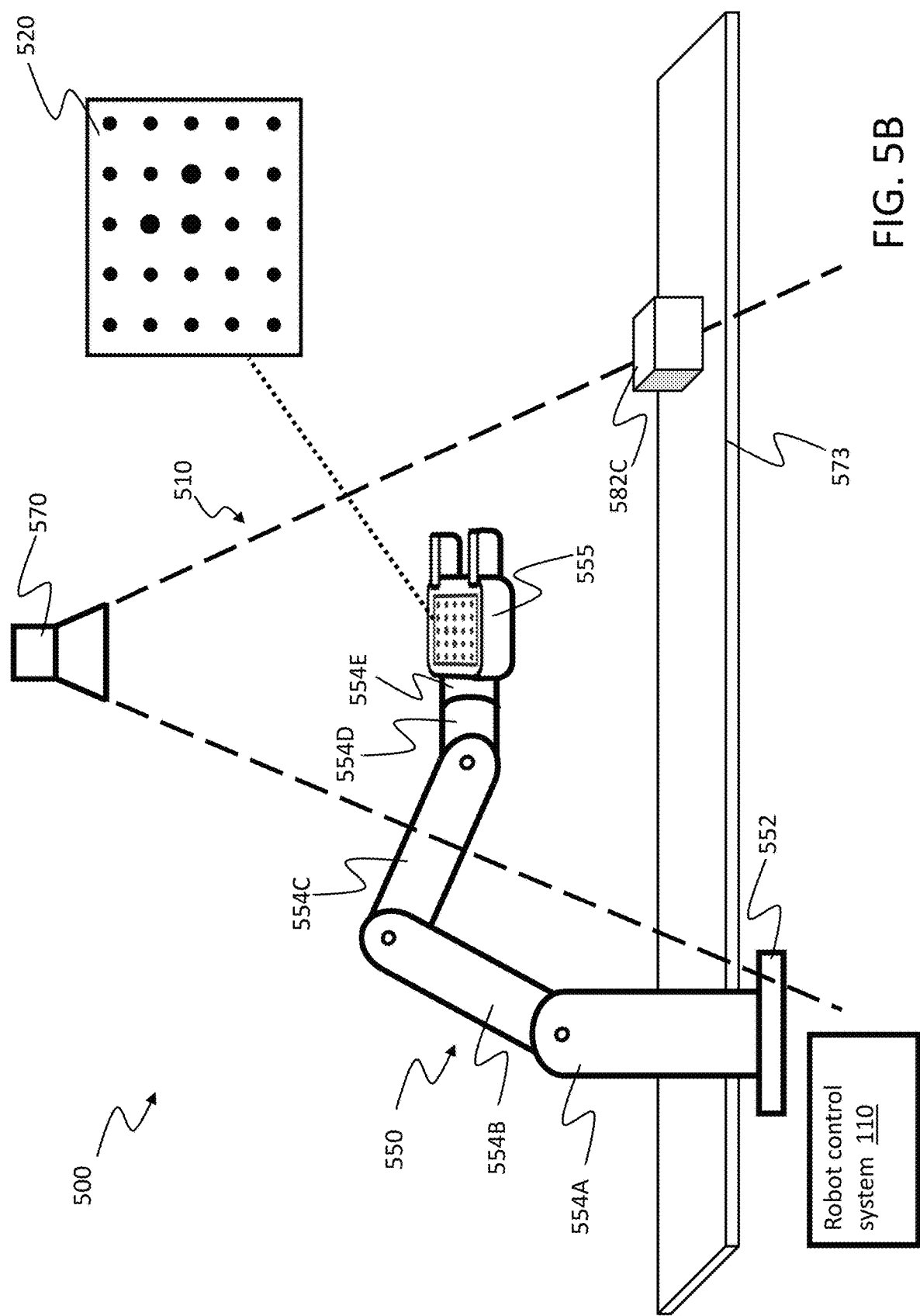

An example environment in which step 401 and other steps of method 400 are performed is depicted in FIGS. 5A and 5B, which depicts a robot operation system 500 that includes the robot control system 110 in communication with a camera 570 and a robot 550, according to one aspect. The camera 570 may be an embodiment of the camera 170/270/370 of FIG. 1, 2, or 3, respectively, and the robot 550 may be an embodiment of the robot 150/250/350 of FIG. 1, 2, or 3, respectively. The robot 550 may include a base 552 and a robot arm movable relative to the base 552. The robot arm includes one or more links, such as links 554A through link 554E. In an embodiment, the links 554A-554E may be rotatably attached to each other. For instance, the link 554A may be rotatably attached to the robot base 552. The remaining links 554B through 554E may be rotatably attached to each other via a plurality of joints. In an embodiment, the base 552 may be used to mount the robot 550 to, e.g., a mounting frame or mounting surface (e.g., floor of a warehouse). The robot 550 may operate in a similar manner to the robot 350. For instance, the robot 550 may include multiple motors configured to move the robot arm by rotating the links 554A-554E. A robot hand 555 may be disposed in a fixed manner on the fifth link 554E and may have a calibration pattern 520 disposed on the robot hand 555. FIG. 5A illustrates an embodiment in which the calibration pattern 520 may not regularly face the camera 570 while the robot 550 is performing a robot task (e.g., picking up a first object 582A) during a robot operation because the robot hand 555 may move in various directions and may rotate away from the camera 570 to perform the robot task. As discussed in more detail below, such an embodiment may wait until an idle period (e.g., when the robot 550 is not required to pick up an object) to rotate the calibration pattern 520 to face the camera 570 so as to capture an image of the calibration pattern 520 (also referred to as a calibration image of the calibration pattern 520). For instance, FIG. 5B illustrates a situation in which the robot 550 may, during an idle period in which the robot 550 is not performing a robot task, move the calibration pattern 520 to face the camera 570 to allow the camera 570 to capture a calibration image of the calibration pattern 520. In FIG. 5B, the robot 550 may have already finished picking up objects 582A and 582B, while a distance between the object 582C and the robot hand 555 of the robot 550 may be more than a defined threshold.

Figure 6A:
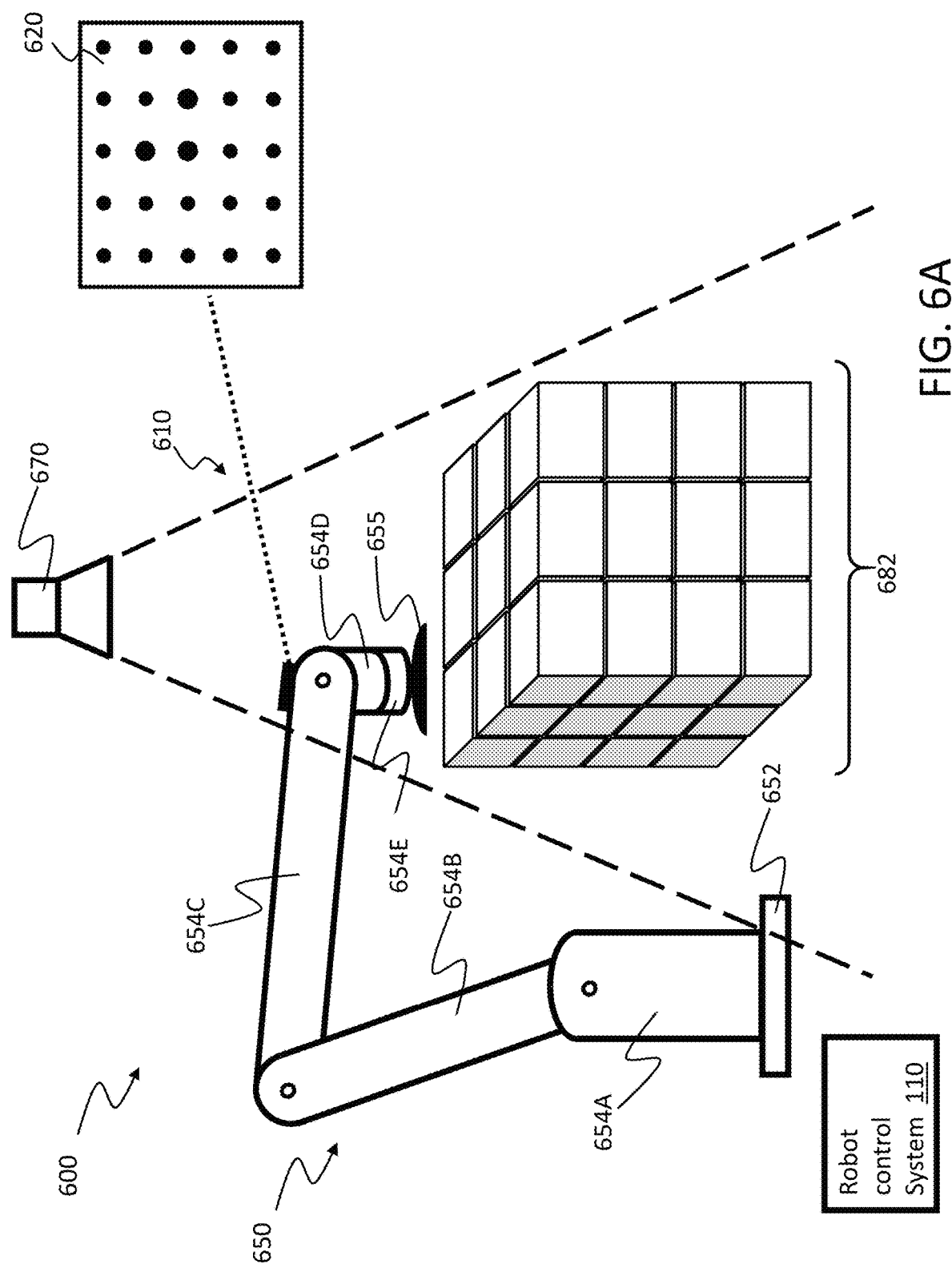
FIGS. 6A and 6B depict an example robot operation system for performing and updating camera calibration, in which the camera calibration is performed in a robot task period, an idle period, or a combination thereof, according to an embodiment hereof.
Figure 6B:
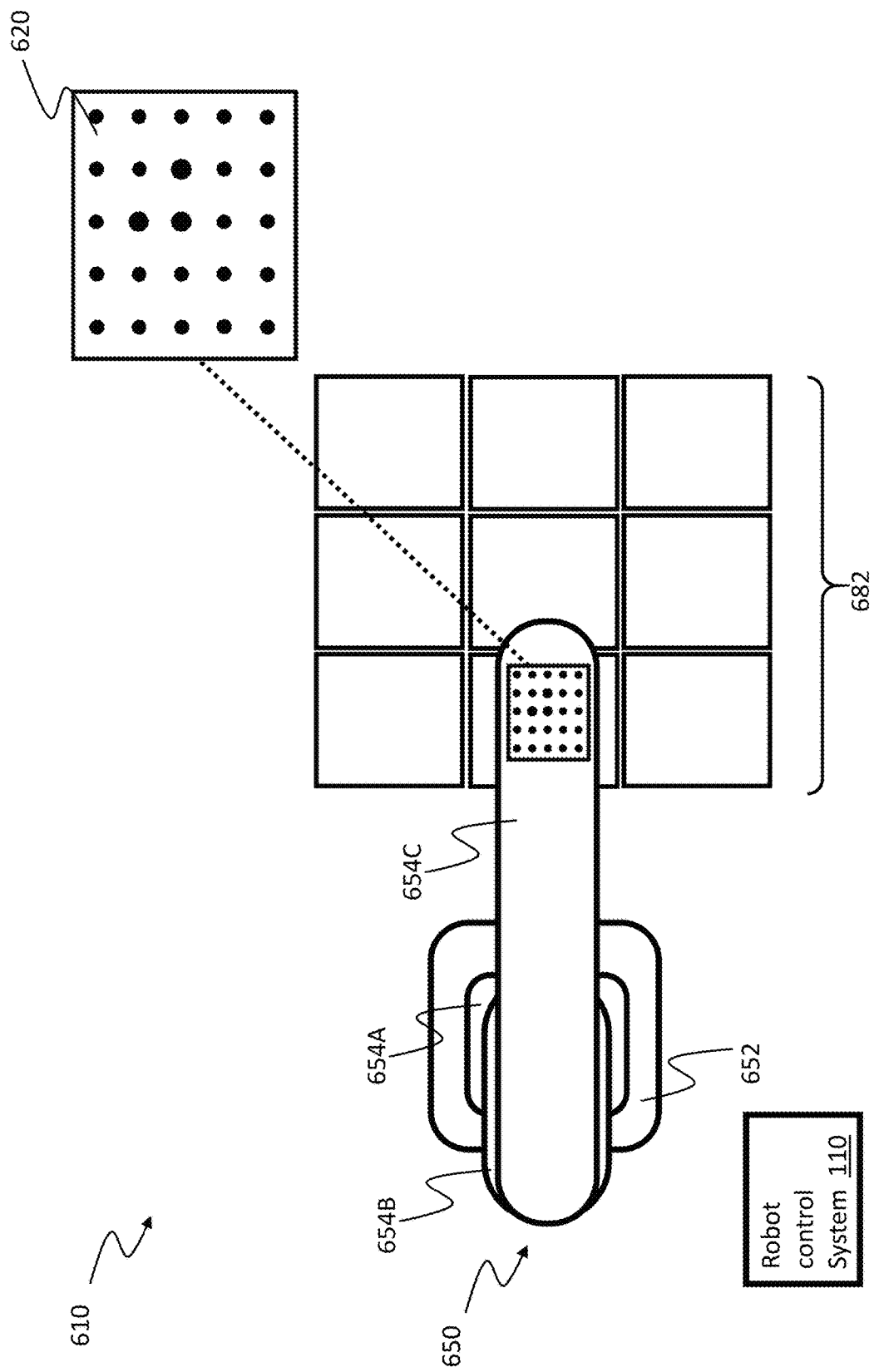

As stated above, in some cases the control circuit 111 may control the camera 170/670 of FIG. 1 or 6, respectively to capture the calibration images without the use of an idle period. An example of such a situation is depicted in FIGS. 6A and 6B, which provide another example environment in which step 401 and other steps of method 400 may be performed. FIGS. 6A and 6B depict a robot operation system 600 (also referred to as the system 600) that includes the robot control system 110 in communication with the camera 670 and a robot 650. FIG. 6A is a side view of the system 600 and FIG. 6B is a top view of the system 600. The camera 670 may be an embodiment of the camera 170/270/370 of FIG. 1, 2, or 3, respectively, and the robot 650 may be an embodiment of the robot 150/250/350 of FIG. 1, 2, or 3, respectively. The robot 650 may include a base 652 and a robot arm movable relative to the base 652. The robot arm includes one or more links, such as links 654A through link 654E. In an embodiment, the links 654A-654E may be rotatably attached to each other. For instance, the link 654A may be rotatably attached to the robot base 652. The remaining links 654B through 654E may be rotatably attached to each other via a plurality of joints. In an embodiment, the base 652 may be used to mount the robot 650 to, e.g., a mounting frame or mounting surface. The robot 650 may operate in a similar manner to the robot 350.

In the embodiment of FIGS. 6A and 6B, a calibration pattern 620 is disposed on a portion of the link 654E, which is constantly facing upward, toward the camera 670, even while the robot 650 is performing a robot task by interacting with the objects 682. In one example, the objects may be packages to be loaded onto or off of a pallet (i.e., packages to be palletized or de-palletized). The robot 650 may be a depalletizer robot configured to stack or unstack the objects 682, and thus may have the calibration pattern 620 facing the camera 670 while performing the robot task by interacting with the objects 682, as shown in FIG. 6B. Because the calibration pattern 620 is facing the camera 670 even when the robot 650 is engaged in a robot operation and is not idle, the robot control system 110 may control the camera 670 to capture the calibration images via the camera 670 without the use of the idle periods.

In an embodiment, the first camera calibration of step 401 may be performed using, e.g. the calibration pattern 520/620 of FIG. 1, 5A, 5B 6A, or 6B. In some cases, the first camera calibration may be an initial camera calibration performed before starting a robot operation. Alternatively, the first camera calibration may be performed during a robot operation. The robot control system 110 may control the robot arm of, e.g., the robot 550/650 to move (e.g., via movement commands) the calibration pattern (e.g., 520/620) to various locations within a field of view 510/610 of the camera 570/670 (also referred to as camera field of view) of FIG. 5A, 5B, 6A, or 6B, respectively, and to capture images of the calibration pattern 520/620 (which may be referred to as calibration images of the calibration pattern 520/620) at such locations. Subsequently, the robot control system 110 may perform the first camera calibration to determine the camera calibration information for the camera (e.g., 570/670) based on the calibration images of the calibration pattern 520/620. The robot control system 110 may control the robot 550/650 to move based on the camera 570/670 and the camera calibration information of the camera 570/670. The accuracy of the camera calibration information may affect the accuracy of the movement of the robot 550/650. Hence, the robot control system 110 may control the camera 570/670 to capture, via the camera 570/670, new calibration images over time, wherein the new calibration images are more recent than the calibration images used to perform the first camera calibration. The new calibration images may be used to perform additional camera calibration, which may yield camera calibration information that is up to date.

Returning to FIG. 4A, the method 400 may further include step 403, in which the control circuit 111 controls, based on the camera calibration information, movement of the robot arm to perform a robot operation, e.g., by outputting a first movement command that is based on the camera calibration information to the robot (e.g., 550/650) via the communication interface (e.g., 113). For instance, the control circuit 111 may output the first movement command that is based on the camera calibration information to the communication interface (e.g., 113), wherein the communication interface (e.g., 113) is configured to communicate the first movement command to the robot to cause the robot arm to move to perform a robot operation (e.g., picking up an object on a conveyor belt).

In step 405, the control circuit 111 controls the robot arm, after the first camera calibration, to move the calibration pattern (e.g., 520/620) to one or more locations within the camera field of view (e.g., 510/610), such as by outputting a second movement command to the robot via the communication interface. For instance, after the first camera calibration, the control circuit 111 may output the second movement command to the communication interface 113, where the communication interface 113 is configured to communicate the second movement command to the robot to cause the robot arm to move the calibration pattern to one or more locations within the camera field of view (e.g., 510/610). The one or more locations may be randomly selected, or may be defined locations. The control circuit 111 may further control the robot arm to orient the calibration pattern (e.g., 520/620) at each of the one or more locations so that the calibration pattern is visible to the camera (e.g., 570/670).

In step 407, the control circuit 111 receives one or more calibration images from the camera (e.g., 170/570/670) via the communication interface (e.g., 113), where the one or more calibration images are respectively captured by the camera (e.g., 170/570/670) when the calibration pattern (e.g., 520/620) is at the one or more respective locations (this may also be referred to as the one or more calibration images being respectively captured at the one or more locations). For instance, the control circuit 111 may receive, from the communication interface 113, the one or more calibration images, where the communication interface 113 is configured to receive the one or more calibration images from the camera 170, wherein the one or more calibration images are respectively captured when the calibration pattern is at the one or more locations, respectively, within the camera field of view. Each image of the one or more calibration images may be captured at a respective location of the one or more locations. In some instances, the control circuit 111 may use the communication interface 113 to retrieve the one or more calibration images from the camera 170. In some instances, step 407 may involve the control circuit 111 generating a camera command and communicating the camera command to the camera 170 via the communication interface 113, wherein the camera command causes the camera 170 to capture the one or more calibration images, and/or to communicate the captured one or more images back to the communication interface 113. In other instances, the camera may automatically capture the one or more calibration images, either periodically or in response to triggering conditions, and automatically communicate the one or more calibration images to the communication interface 113 or to a storage device that is accessible by the communication interface 113.

For instance, as illustrated in FIG. 5B, a control circuit of the robot control system 110 may control the robot arm of the robot 550 to move the calibration pattern 520 to one or more locations within the camera field of view 510, such that the robot control system 110 may capture, via the camera 570, one or more respective calibration images corresponding to the calibration pattern 520 being at the one or more locations, respectively. In some cases, the one or more locations may be a plurality of locations. In such cases, after a calibration image has been captured by a camera while the calibration pattern 520 is at a first location, the robot control system 110 may move the calibration pattern 520 to a second location and capture another calibration image while the calibration pattern 520 is at the second location. When a calibration image is being captured, the robot control system 110 may control the robot 550 to move the calibration pattern 520 such that the calibration pattern 520 faces the camera 570. For instance, the robot control system 110 may control the robot 550 to orient the calibration pattern 520 such that the calibration pattern 520 is visible to the camera 570.

Returning to FIG. 4A, the method 400 may further include step 409, in which the control circuit 111 adds the one or more calibration images to a captured image set which includes the calibration images. In an embodiment, the captured image set may be a set of images stored on, e.g., the non-transitory computer-readable medium 115 or any other storage device.

In some cases, the captured image set may have a fixed size and may, for example, include a specific maximum number of the calibration images. For instance, the fixed size may be 27, such that the captured image set holds exactly 27 calibration images, such as the 27 most recently captured calibration images. It is understood that the fixed size for the captured image set may be set to a fixed value other than 27. A camera calibration may be performed using some or all of the images in the captured image set. In such a scenario, the captured image set may act as a sliding window that slides to cover a defined number of the most recently captured images.

In some cases, the captured image set may start from a size of zero, and may increase in size as calibration images are added to the set. For instance, the captured image set may be reset after the first camera calibration is performed in step 401. The captured image set may be reset by removing (e.g., deleting) all of the calibration images from the set, such that it has a size of zero at a beginning of step 409. In this case, the captured image set may increase in size as the calibration images are added thereto, and may have a defined maximum size (e.g., 27 calibration images) that limits a total number of the calibration images in the captured image set. The defined maximum size may, in an embodiment, be equal to a target count, which is discussed below. For example, the target count may indicate a minimum number of calibration images for performing reliable camera calibration. The target count may be a value that is defined manually or dynamically, and thus may be referred to as a defined target count. In some situations, the captured image set is not used to perform the camera calibration until the captured image set has reached the defined maximum size. Once the captured image set reaches the maximum size, the control circuit 111 may discard a number of the oldest calibration images in the set when an equal number of the most recent calibration images are added, such that the captured image set acts as a sliding window that captures a defined number of the most recently captured images. In an embodiment, the control circuit 111 may determine whether a total number of the calibration images in the captured image set equals the defined target count every time a calibration image is added to the captured image set, such as during step 409.

The method 400 may further include step 411, in which the control circuit 111 performs a second camera calibration based on the calibration images in the captured image set, wherein the second camera calibration outputs updated camera calibration information. For instance, after the robot control system 110 performs the first camera calibration, the robot control system 110 may control the camera (e.g., 570/670) to continue capturing calibration images over a period of time, and may add these captured calibration images to the captured image set, which may include a number of the most recently captured calibration images. The robot control system 110 may then perform a second camera calibration based on the calibration images in the captured image set. Because the second camera calibration is subsequent to the first camera calibration, it may be referred to as a subsequent camera calibration.

In an embodiment, the second camera calibration may be performed only when a total number of calibration images in the captured image set has reached the defined target count (e.g. 27 calibration images). For instance, the defined target count may be defined to ensure that a sufficient number of the calibration images may be used for each camera calibration following an initial camera calibration, or more generally for each camera calibration following the first camera calibration. For example, the defined target count may represent a minimum number of the calibration images to be used for each camera calibration to achieve high accuracy.

In an embodiment, the control circuit 111 is configured to update the captured image set by adding a number of one or more calibration images that are most recently captured by the camera (e.g., 170/570/670) to the captured image set, and removing from the captured image set an equal number of one or more calibration images that were least recently captured by the camera (e.g., 170/570/670). This may occur, for instance, when the number of the calibration images in the captured image set is equal to its maximum size or fixed size, e.g., as determined by the target count, such that the newest calibration images replace the oldest calibration images in the set. In such an embodiment, when the second camera calibration is performed, a total number of the calibration images in the captured image set is equal to the defined target count. In an embodiment, the control circuit 111 may store a list that identifies which calibration images are in the captured image set. For instance, the list may include image identifiers (e.g., file names) of respective calibration images in the captured image set. When a calibration image is added to the captured image set, the control circuit 111 may be configured to add an image identifier for the calibration image to the list, which may effectively add the calibration image to the captured image set. In this example, the control circuit 111 may also remove from the list another image identifier corresponding to an oldest calibration image in the captured image set, which may effectively remove the oldest calibration image from the captured image set.

As stated above, the control circuit 111 may be configured to detect an idle period during the robot operation, and to output the second movement command during the idle period such that the robot arm is controlled to move the calibration pattern (e.g., 160/520/620) to the one or more locations during the idle period and the one or more respective calibration images are captured at the one or more locations during the idle period. For instance, as illustrated in FIG. 5A, the robot control system 110 may detect an idle period between a robot task associated with the second object 582B and a robot task associated with the third object 582C because a large gap exists between the second object 582B and the third object 582C. In one example, the robot control system 110 may detect the idle period when no object upstream on the conveyor belt 573 is reachable by the robot 550 and/or when the robot control system 110 determines that a distance between the robot 550 and the closest object (e.g., third object 582C) upstream on the conveyor belt 573 exceeds a certain threshold. As illustrated in FIG. 5B, the robot control system 110 may control the robot arm of the robot 550 to move the calibration pattern 520 to a location during the idle period and capture the calibration image (e.g., a first calibration image) at the location during the idle period. If more time is remaining in the idle period, the robot control system 110 may control the robot arm of the robot 550 to move the calibration pattern 520 to another location and control the camera 570 to capture another calibration image (e.g., a second calibration image). The robot arm may be controlled to orient the calibration pattern 520 at each of the locations to be visible to the camera 570.

In an embodiment, the above idle period may be a first idle period, and the control circuit 111 may be configured to determine that a total number of calibration images in the captured image set has reached the defined target count. In such an embodiment, the control circuit 111 may be configured to detect, after the first idle period, a second idle period during the robot operation, and may be further configured to determine whether the second idle period is longer than or equal to a defined calibration time period. In an embodiment, the defined calibration time period may indicate an amount of time necessary to complete the second camera calibration. As stated above, completing the second camera calibration may involve performing calculations to determine the intrinsic parameters of the camera, and/or transformation functions (e.g., matrices) that describe a relationship between the camera and the robot. The defined calibration time period may indicate an amount of time necessary to perform such calculations. In response to a determination that the second idle period is longer than or equal to the defined calibration time period, the control circuit 111 may be configured to complete the second camera calibration in the second idle period.

On the other hand, in response to a determination that the second idle period is shorter than the defined calibration time period, the control circuit 111 may be configured to postpone the completion of the second camera calibration to a subsequent (e.g., third) idle period. In some cases, no more calibration images are captured during the second idle period. In other cases, the control circuit 111 may receive (e.g., retrieve) one or more additional calibration images from the camera (e.g., 170/570/670) via the communication interface 113 during a remaining amount of time in the second idle period, wherein the camera (e.g., 170/570/670) is configured to capture (e.g., in response to a camera command) the one or more additional calibration images respectively at one or more additional locations within the camera field of view (e.g., 510/610), so as to provide recent calibration images from the second idle period for the second camera calibration. The control circuit 111 may update the captured image set by adding the one or more additional images to the captured image set and by removing an equal number of one or more calibration images that were least recently captured by the camera (e.g., 170/570/670) so as to generate an updated captured image set. The control circuit 111 may wait until a subsequent idle period that is longer than or equal to the defined calibration time period to complete the second camera calibration with the updated captured image set.

As stated above, as the calibration images are captured and added to the captured image set, a size of the captured image set may increase. If the size of the captured image set indicates that a number of captured calibration images in the captured image set equals the defined target count discussed above, then a sufficient number of calibration images are available in the captured image set for the second camera calibration. In an embodiment, completing the second camera calibration may involve performing the calculation discussed above or other steps for the second camera calibration, and these calculations or other steps may need at least an amount of time equal to the defined calibration time period. Hence, in this embodiment, an idle period that is at least as long as the defined calibration time period is needed to complete the second camera calibration. Thus, after determining that the number of captured calibration images in the captured image set has reached the defined target count, if the subsequent (e.g., third) idle period is longer than or equal to the defined calibration time period, then the robot control system 110 may perform the second camera calibration during the subsequent idle period.

On the other hand, if the subsequent (e.g., third) idle period is shorter than the defined calibration time period, the robot control system 110 may decide not to complete the second camera calibration during the subsequent idle period, but may instead capture additional calibration images during the subsequent (e.g., third) idle period. Then, the captured image set is updated by adding the additional calibration images to the captured image set and by removing an equal number of the oldest calibration images (i.e., least recently captured calibration images) from the captured image set, so that the updated captured image set maintains the same size, which is equal to the defined target count. When the robot control system 110 detects another (e.g., fourth) idle period having a duration that is longer than or equal to the defined calibration time period, the robot control system 110 may complete the second camera calibration during that (e.g., fourth) idle period.

As an example, assuming that the defined target count is 10, a size of a captured image set S may be limited to 10 calibration images or less. In this example, 10 calibration images $I_1$-$I_{10}$ are captured by a camera, where $I_1$ is captured earliest in time and $I_{10}$ is captured most recently in time. The 10 images may be added to the captured image set S. If two additional calibration images $I_{11}$ and $I_{12}$ are captured, the two additional calibration $I_{11}$ and $I_{12}$ are added to the captured image set S, and the two calibration images $I_1$ and $I_2$ captured earliest in time are removed from the captured image set S to generate an updated captured image set S, as shown below:

Captured image set $S=[I_1,I_2,I_3,I_4,I_5,I_6,I_7,I_8,I_9,I_{10}]$

Additional calibration images$=[I_{11},I_{12}]$

Updated captured image set $S=[I_3,I_4,I_5,I_6,I_7,I_8,I_9,I_{10},I_{11},I_{12}]$ In an embodiment, the idle period discussed above may be the first idle period, and the control circuit 111 may be configured to determine, after the first idle period, that a total number of calibration images in the captured image set has not reached the defined target count. In such an embodiment, the control circuit 111 may wait for the second idle period, so that more calibration images may be captured via the camera (e.g., 170/570/670) and communicated to the control circuit 111 via the communication interface 113. More specifically, the control circuit 111 may be configured to detect the second idle period that follows the first idle period, and to receive one or more additional calibration images from the camera 170/570/670 via the communication interface 113 during the second idle period, where the camera 170/570/670 is configured to capture the one or more additional calibration images when the calibration pattern is placed at one or more additional locations, respectively, within the camera field of view 510/610. The control circuit 111 may be configured to add the one or more additional calibration images to the captured image set so as to generate the updated captured image set. After the one or more additional calibration images have been added to the captured image set in the second idle period to generate the updated captured image set, the control circuit 111 may be further configured to determine whether a total number of calibration images in the updated captured image set has reached the defined target count. In response to a determination that the total number of calibration images in the updated captured image set has reached the defined target count, the control circuit 111 may be configured to determine whether a remaining time in the second idle period is longer than or equal to the defined calibration time period which indicates an amount of time necessary to complete the second camera calibration. The control circuit 111 may perform the second camera calibration in response to a determination that the remaining time in the second idle period is longer than or equal to the defined calibration time period. If the remaining time in the second idle period is shorter than the defined calibration time period, the control circuit 111 may postpone the completion of the second camera calibration to a subsequent idle period, and may use the remaining time in the second idle period to control the camera to capture additional calibration images, or more generally to receive additional calibration images from the camera 170/570/670.

In an embodiment, when the control circuit 111 of the robot control system 110 determines that a total number of calibration images in the captured image set has not reached the defined target count, it may continue to control the camera (e.g., 170/570/670) to capture more calibration images (or, more generally, to receive more calibration images from the camera 170/570/670) and to add them to the captured image set, either during an idle period or a subsequent idle period(s), until the total number of calibration images in the captured image set reaches the defined target count.

In one instance, in FIG. 5A or 5B, when the robot control system 110 captures additional calibration images via the camera 570 during the second idle period and adds the additional calibration images to the captured image set to generate the updated captured image set, the total number of calibration images in the updated captured image set may reach the defined target count before the second idle period ends. In such a scenario, the robot control system 110 may determine whether a sufficient time is remaining in the second idle period to perform the second camera calibration by determining whether the remaining time in the second idle period is longer than or equal to the defined calibration time period. If the remaining time in the second idle period is longer than or equal to the defined calibration time period, the robot control system 110 may perform the second camera calibration during the remaining time in the second idle period.

On the other hand, in response to a determination that the remaining time in the second idle period is shorter than the defined calibration time period, the control circuit 111 may be further configured to receive one or more subsequent additional calibration images form the camera 570 via the communication interface 113 during the remaining time in the second idle period, where the camera 570 is configured to capture the one or more subsequent additional calibration images respectively at one or more subsequent additional locations within the camera field of view 510. The control circuit 111 may be further configured to update the captured image set by adding the one or more subsequent additional calibration images and by removing an equal number of calibration images in the captured image set that were least recently captured. The control circuit 111 may be configured to wait until a subsequent idle period to complete the second camera calibration with the updated captured image set. For instance, when the additional calibration images are captured to bring the total number of calibration images in the updated captured image set to the defined target count before the second idle period ends, the remaining time in the second idle period may be shorter than the defined calibration time period. Then, the robot control system 110 may postpone the completion of the second camera calibration to a subsequent (e.g., third) idle period, and may instead use the remaining time of the second idle period to capture more recent calibration images. The captured image set is updated by adding the more recent calibration images to the captured image set and by removing an equal number of the oldest calibration images. When the robot control system 110 detects, after the second idle period, a subsequent idle period that is longer than or equal to the defined calibration time period, the robot control system 110 may perform the second camera calibration during this subsequent idle period.

In an embodiment, the control circuit 111 may be configured, each time a new calibration image is added to the captured image set, whether the total number of calibration images in the captured image set exceeds the defined target count. In response to a determination that the total number of calibration images in the captured image set exceeds the defined target count, the control circuit 111 may be configured to remove a least recently captured calibration image from the captured image set to maintain the total number of calibration images in the captured image set to the defined target count.

Returning to FIG. 4B, the method 400 may further include step 451, in which the control circuit 111 determines an amount of deviation between the camera calibration information (generated from the first camera calibration) and the updated camera calibration information (generated from the second camera calibration). For instance, the amount of deviation may indicate how much deviation the camera 570/670 has experienced between the first camera calibration and the second camera calibration. In an embodiment, the camera calibration information and the updated camera calibration information include respective values for a calibration parameter. For instance, the amount of deviation may be based on a difference between a first set of calibration parameter values obtained from the first camera calibration and a second set of calibration parameter values obtained from the second camera calibration. As an example, the calibration parameter may be, e.g., a distortion parameter, a projection matrix, and/or a transformation function that describes a relationship between a camera (e.g., 570/670) and a robot (e.g., 550/650). In such an example, the camera calibration information may indicate a first calibration parameter value or first set of calibration parameter values for the calibration parameter, and the updated camera calibration information may indicate a second calibration parameter value or second set of calibration parameter values for the calibration parameter. The amount of deviation between the camera calibration information and the updated camera calibration information may be based on a difference between the first calibration parameter value and the second calibration parameter value, or based on respective differences between the first set of calibration parameter values and the second set of calibration parameter values. In another example, the camera calibration information and the updated camera calibration information may be based on respective coordinates of a pattern element of the calibration pattern 520/620. In such an example, the amount of deviation may be based on an overall difference between a set of coordinates at which the pattern elements appear in the calibration image obtained for the first camera calibration and a set of coordinates at which the pattern elements appear in the calibration image obtained by the second camera calibration.

Returning to FIG. 4B, the method 400 may further include step 453, in which the control circuit 111 determines whether the amount of deviation exceeds a defined threshold (which may also be referred to as a defined deviation threshold). For example, the control circuit 111 may compare the amount of deviation with the defined deviation threshold to determine whether the deviation exceeds a defined threshold. In an embodiment, the defined deviation threshold may indicate when the updated camera calibration information discussed above has changed too much relative to the camera calibration information (e.g., baseline camera calibration information) discussed above. For instance, a large change between the baseline camera calibration information and the updated calibration information may reflect an undesirable condition in an external environment of the camera (e.g., 170/570/670), such as an external environment in which temperature is unregulated and temperature change is causing a significant change in the camera calibration information, or such as a condition in which the camera (e.g., 170/570/670) is not securely mounted to a mounting structure and movement of the camera caused by external forces is causing a significant change in the camera calibration information. In an embodiment, the defined deviation threshold may indicate when the updated camera calibration information has changed too quickly from the camera calibration information (e.g., baseline camera calibration information). For instance, if a user bumps into the camera (e.g., 170/570/670) or the robot (e.g., 150/550/650) and causes either the camera or the robot to suddenly shift in position, the sudden shift may be reflected in a sudden and significant change in camera calibration information. In such an embodiment, the defined deviation threshold may have a value that is a defined rate of change.

The method 400 may further include step 455, in which the control circuit 111 outputs, in response to a determination that the amount of deviation exceeds the defined threshold, a notification signal that indicates the amount of deviation exceeds the defined threshold. In an embodiment, the notification may be output to a user interface device, such as user interface device 180. In an embodiment, the defined threshold may be adjusted based on a temperature in an environment surrounding the camera. For example, when the temperature is within a defined normal operating temperature range (e.g., within 10 degrees of the room temperature), then the defined threshold may be defined to have a first value. When the temperature is outside the normal operating temperature range, then the defined threshold may be defined to a second value lower than the first value.

In an embodiment, the amount of deviation exceeding the defined threshold may indicate that undesirable errors may result if the robot operation continues, because the properties associated with the camera 570/670 may have deviated too much from an initial state. Therefore, the control circuit 111 outputs the notification signal to indicate the amount of deviation exceeding the defined threshold, such that an operator of the robot 550/650 may address the deviation before the robot operation continues. On the other hand, if the amount of deviation does not exceed the defined threshold, the control circuit 111 may continue with the robot operation without outputting the notification signal. Further, if the amount of deviation does not exceed the defined threshold, the control circuit 111 may reset the captured image set (e.g., by removing all images from the captured image set) and start capturing new calibration images to be used for another (e.g., third) camera calibration.

Figure 7B:
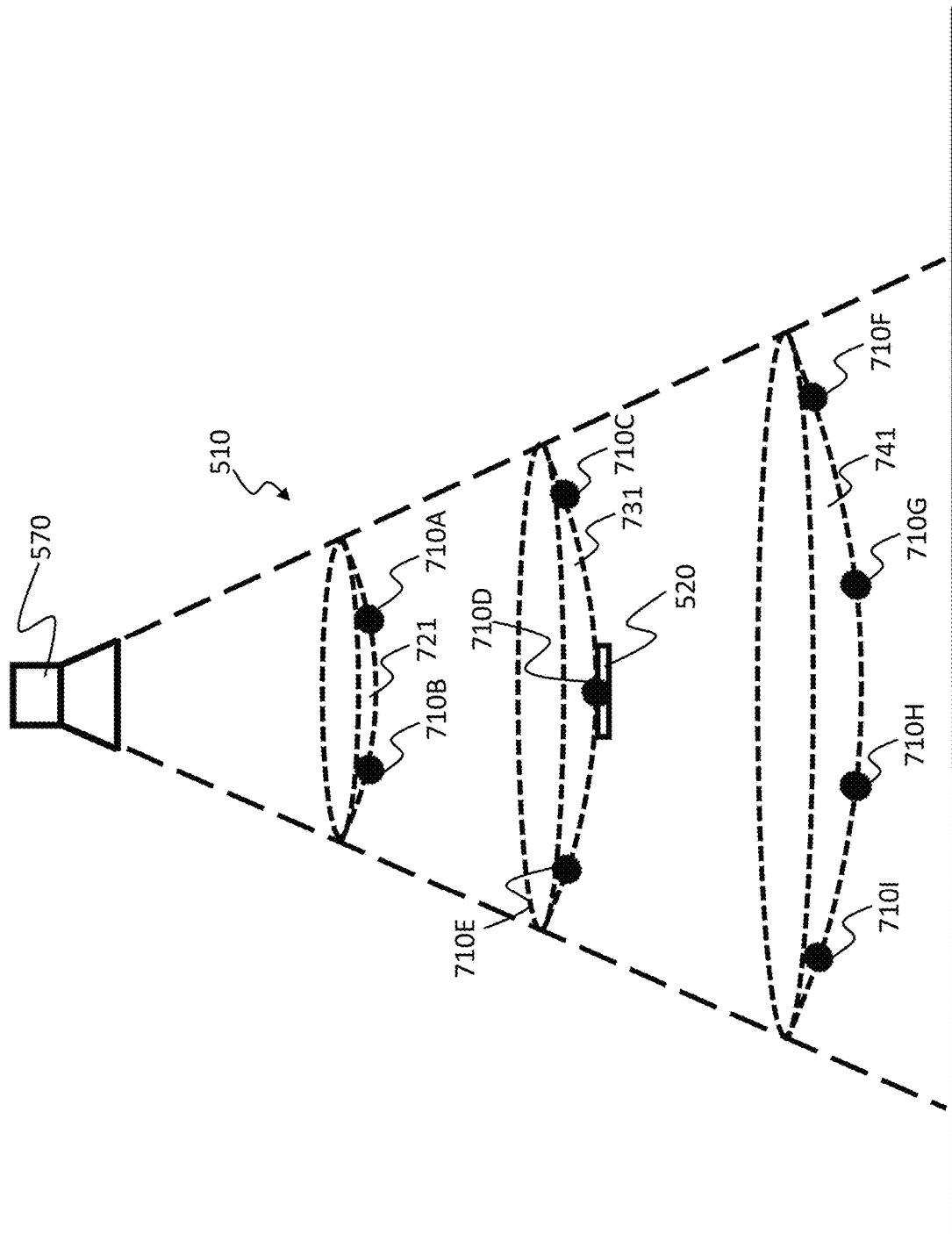

In an embodiment, one or more locations to which the robot arm moves the calibration pattern (e.g., 520/620) to capture calibration images may include a plurality of locations, where each of the plurality of locations is a location disposed on a surface of an imaginary sphere that is concave with respect to the camera (e.g., 570/670). In such an embodiment, the control circuit 111 may be further configured to control the robot arm to move the calibration pattern (e.g., 520/620) to be tangent to the surface of the imaginary sphere at each location of the plurality of locations. For instance, as illustrated in FIGS. 7A and 7B, the robot control system 110 may control the robot arm of the robot 550 to move the calibration pattern 520 to locations 710A-710I, and capture a respective calibration image at each of the locations 710A-710I. The locations 710A-710I may be divided among a plurality of imaginary spheres within the field of view 510 of the camera 570. For example, the locations 710A and 710B may be disposed on a first spherical surface 721 of a first imaginary sphere 720, where the first spherical surface 721 that include locations 710A and 710B is (partially or completely) within the field of view 510 of the camera 570. As another example, the locations 710C, 710D, and 710E may be disposed on a second spherical surface 731 of a second imaginary sphere 730, where the second spherical surface 731 that include locations 710C, 710D, and 710E is within the field of view 510. In a further example, the locations 710F, 710G, 710H, and 710I may be disposed on a third spherical surface 741 of a third imaginary sphere 740, where the third spherical surface 741 that includes the locations 710F, 710G, 710H, and 710I is within the field of view 510. As illustrated in FIGS. 7A and 7B, the first, second, and third spherical surfaces 721, 731, and 741, respectively, are concave with respect to the camera 570. Although the examples in FIGS. 7A and 7B show three spherical surfaces based on three spheres, a number of different spherical surfaces on which locations may be disposed may be greater than three or less than three. In an embodiment, the camera 570 may be a center of each of the imaginary spheres 720, 730, and 740.

In an embodiment, as illustrated in FIGS. 7A and 7B, when the calibration pattern 520 is moved to a location, the robot control system 110 may control the robot arm of the robot 550 to position the calibration pattern 520 to be tangent to the spherical surface on which the location is disposed. For example, FIG. 7B illustrates that the calibration pattern 520 is tangent to the second spherical surface 731 at the location 710D. More particularly, the calibration pattern 520 may be disposed on a flat plane (e.g., on a sticker), and the flat plane of the calibration pattern 520 may be tangent to the second spherical surface 731 at the location 710D.

In an embodiment, the control circuit 111 is configured to control the robot arm to move the calibration pattern (e.g., 520) to directly face the camera when the calibration pattern (e.g., 520) is moved to a location. For instance, as illustrated in FIG. 7A, the robot control system 110 may control the robot arm of the robot 550 to move the calibration pattern 520 to directly face the camera 570 when the calibration pattern 520 is moved to the location 710D. In this example, the robot control system 110 may control the robot hand 555 to be rotated such that the calibration pattern 520 directly faces the camera 570. In some cases, the calibration pattern 520 may directly face the camera 570 by being tangent to the spherical surface (e.g. the first spherical surface 721, the second spherical surface 731, the third spherical surface 741) at the camera's field of view 510. When the calibration pattern 520 directly faces the camera 570, the camera 570 may be able to photograph the calibration pattern 520 head-on, so that there is no perspective effect or a reduced perspective effect in a resulting image of the calibration pattern 520.

Figure 8:
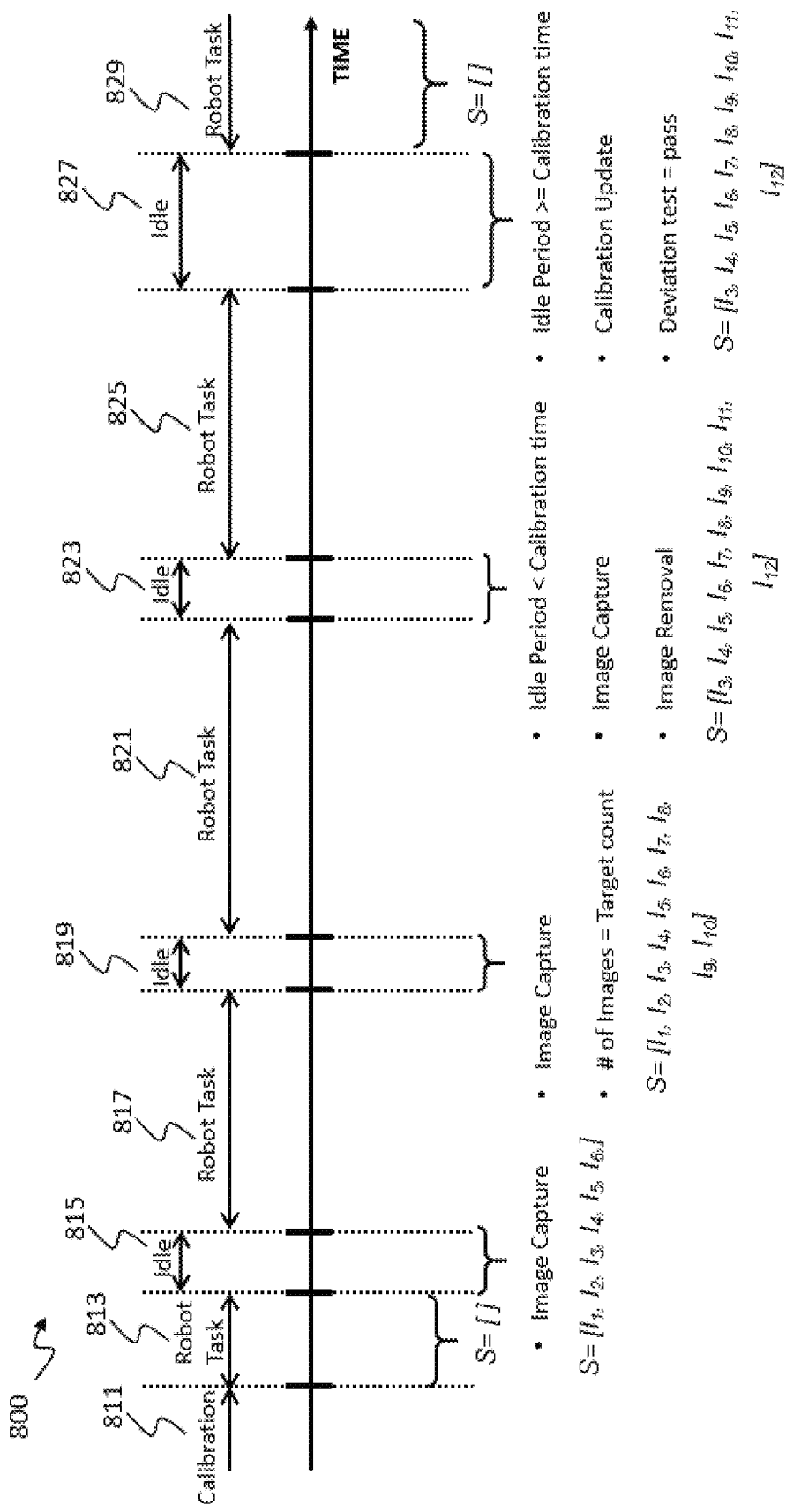
FIG. 8 depicts an example time line for performing and updating camera calibration, in which the camera calibration is performed during an idle period, according to an embodiment hereof.

FIG. 8 depicts an example time line 800 where the camera calibration update process is performed. In an embodiment, the time line 800 may relate to operations performed by the system 500 of FIGS. 5A and 5B. The time line 800 may begin with a calibration period 811, which may occur before a robot operation begins. For instance, the robot control system 110 of FIG. 1A, 1i, or 1C may perform the first camera calibration to determine the camera calibration information for the camera 570. After the first camera calibration is complete, the robot operation begins with a robot task period 813.

During the robot task period 813, the robot control system 110 may control the robot 550 (from FIGS. 5A and 5B) to perform one or more robot tasks. As discussed above with respect to FIGS. 5A and 5B, the system 500 may be unable to capture any calibration image during the robot task period 813, and may have to wait until an idle period is detected to do so.

As depicted in FIG. 8, the robot control system 110 may, after the task period 813, detect an idle period 815, during which the robot 550 is free from performing a robot task. During the idle period 815, the robot control system 110 captures, via the camera 570, one or more calibration images of the calibration symbol 520 of FIGS. 5A and 5B at one or more locations (e.g., at a first set of six locations), respectively, and adds these calibration images to the captured image set. In the example of FIG. 8, the calibration images $I_1$-$I_6$ are captured during idle period 815 and are added to the captured image set S.

After the idle period 815 ends, during a task period 817, the robot control system 110 resumes controlling the robot 550 to perform one or more robot tasks. During the task period 817, the system 500 may be unable to capture any calibration image. After the idle period 817, the robot control system 110 in this example detects an idle period 819 during which the robot 550 is free from performing a robot task. During the idle period 819, the robot control system 110 captures the calibration images $I_7$-$I_{10}$ of the calibration pattern 520 at a second set of four other locations, respectively. The captured images $I_7$-$I_{10}$ are added to the captured image set S. As a result, the captured image set S includes $I_1$-$I_{10}$ after the second idle period 819. In an embodiment, the defined target count may be equal to ten. Because the captured image set S now has ten calibration images, the robot control system 110 may be ready to perform a second camera calibration. However, this second camera calibration may be postponed to a subsequent idle period (e.g., 827), because the second idle period 819 may have already elapsed or nearly elapsed.

After the idle period 819, the robot control system 110 resumes controlling the robot 550 to perform one or more robot tasks during a robot task period 821. After the robot ask period, the robot control system 110 may detect an idle period 823 during which the robot 550 is free from performing a robot task. The robot control system 110 further determines that the idle period 823 is shorter than the defined calibration time period, and thus determines not to perform the calculations or other steps for completing the second camera calibration during the idle period 823. Instead, the robot control system 110 may wait for a subsequent idle period (e.g., idle period 827) to complete the second camera calibration. In some cases, the robot control system 110 may allow the idle period 823 to elapse without capturing any more calibration images. Alternatively, as depicted in FIG. 8, the robot control system 110 may capture additional calibration images $I_{11}$-$I_{12}$ during the idle period 823, and add them to the captured image set S. Because the total number of calibration images in the captured image set S has already reached the defined target count of 10 of the calibration images, the robot control system 110 may remove an equal number of the oldest calibration images in the captured image set S from the captured image set S. More specifically, in this embodiment, the robot control system 110 can remove the two oldest instances of the calibration images $I_1$-$I_2$ from the captured image set S since two newly captured instances of the calibration images $I_{11}$-$I_{12}$ were added to the captured image set S. As a result, the captured image set S now includes the calibration images $I_3$-$I_{12}$.

As illustrated in FIG. 8, the idle period 823 may be followed by a robot task period 825 and then another idle period 827. The robot control system 110 may determine that this idle period 827 has a duration that is longer than or equal to the defined calibration time period, and thus determines to perform the calculation or other steps necessary to complete the second camera calibration during the idle period 827. During the idle period 827, the robot control system 110 performs the second camera calibration to determine updated camera calibration information based on the calibration images in the captured image set. In this example, the second camera calibration is performed based on the calibration images $I_3$-$I_{12}$ included in the captured image set. After the second camera calibration is complete, the robot control system 110 determines the amount of deviation between the camera calibration information from the first camera calibration and the updated camera calibration information from the second camera calibration. In this example, because the amount of deviation does not exceed the defined threshold, the robot control system 110 may continue with the robot operation by performing robot tasks during the task period 829.

Figure 9:
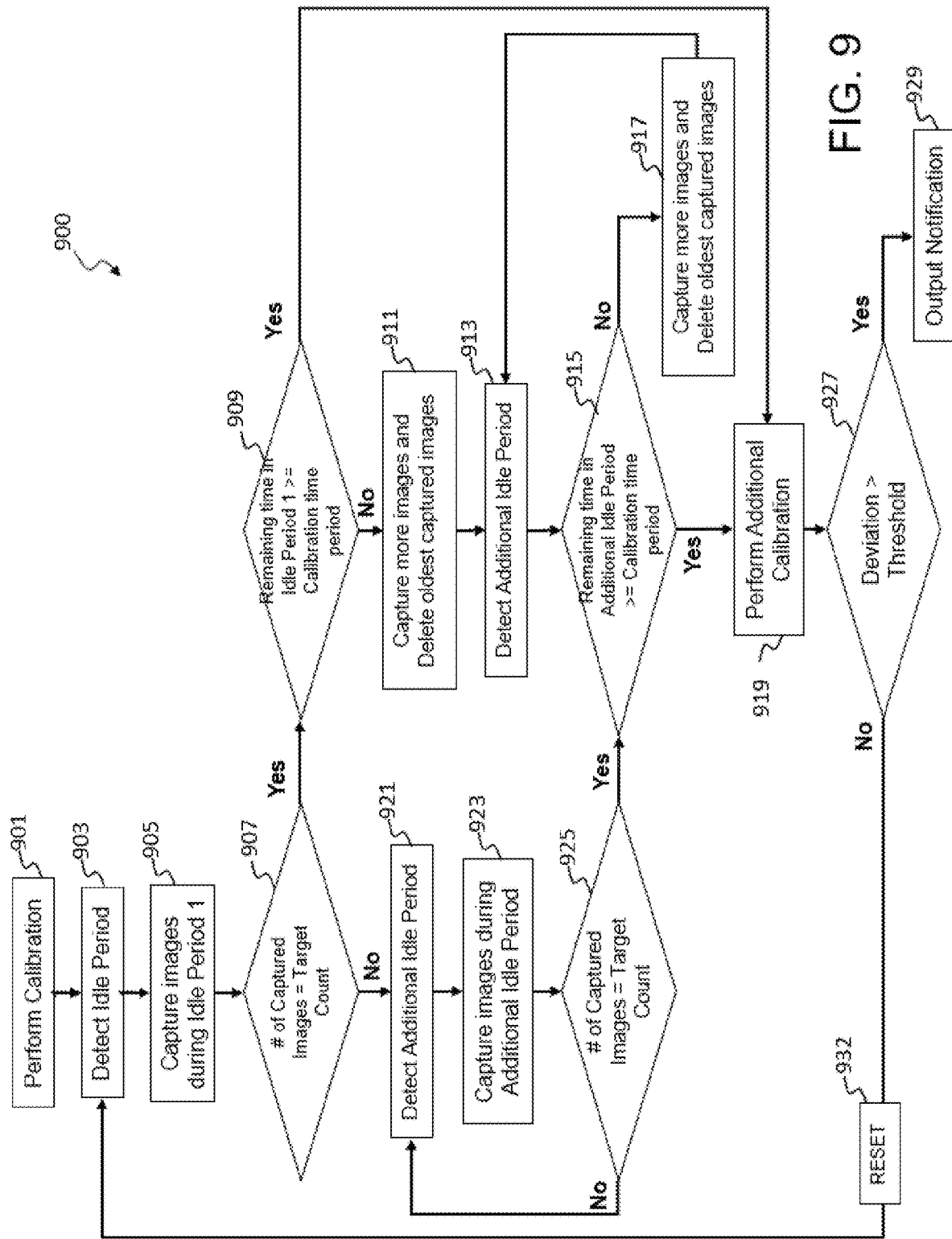
FIG. 9 depicts an example flow diagram for performing and updating camera calibration, in which the camera calibration is performed during an idle period, according to an embodiment hereof.

FIG. 9 depicts an example flow diagram 900 that shows a camera calibration update process that reflects the features discussed above for FIGS. 4A, 4B, 5A, 5B, and 8. The steps of the flow diagram 900 may be performed by, e.g., the system 500 of FIGS. 5A and 5B. At step 901, the robot control system 110 of FIG. 1A, 1, or 1C performs the first camera calibration of the camera 570 of FIGS. 5A and 5B to determine camera calibration information of the camera 570.

After the first camera calibration, the robot control system 110 may begin a robot operation after the first camera calibration.

At step 903, the robot control system 110 detects an idle period during the robot operation, as discussed above. At step 905, during the idle period, the robot control system 110 controls the robot 550 of FIGS. 5A and 5B to move the calibration pattern 520 of FIGS. 5A and 5B to one or more locations within a camera field of view 510 of FIGS. 5A and 5B of the camera 570, and captures one or more respective calibration images via the camera 570 at the one or more locations. The captured calibration images may be added to the captured image set. In an embodiment, the captured image set may have zero instances of the captured calibration images at the beginning of step 905 and thus may have a size zero at the beginning of step 905.

At step 907, the robot control system 110 determines whether a total number of the captured calibration images within the captured image set has reached the defined target count. If the total number of the captured calibration images within the captured image set has reached the defined target count, the robot control system 110 determines whether a remaining time in the idle period is longer than or equal to the defined calibration time period, at step 909. The defined calibration time period may indicate an amount of time necessary to complete an additional camera calibration (e.g., a second camera calibration). If the remaining time in the idle period is longer than or equal to the defined calibration time period, the robot control system 110 performs the additional camera calibration, at step 919.

Returning to step 909, if the remaining time in the idle period is shorter than the defined calibration time period, the robot control system 110 does not complete the additional camera calibration in that time period. Instead, at step 911, during the remaining time in the idle period, the robot control system 110 captures, via the camera 570, new calibration images and updates the captured image set by adding these new calibration images to the captured image set and by removing an equal number of calibration images least recently captured by the camera 570 to maintain the total number of the calibration images in the captured image set at the defined target count. The robot control system 110 may resume performing robot tasks after the idle period is over after 911.

At step 913, the robot control system 110 attempts to detect an additional idle period during the robot operation. When the additional idle period is detected, the robot control system 110 may at step 915 determine whether the additional idle period is longer than or equal to the defined calibration time period. If the additional idle period is shorter than the defined calibration time period, the robot control system 110 at step 917 captures, via the camera 570, new calibration images and updates the captured image set by adding these new calibration images to the captured image set and by removing an equal number of calibration images least recently captured by the camera 570 to maintain the total number of the calibration images in the captured image set at the defined target count. The robot control system 110 may return to step 913 and wait for a subsequent idle period that has a duration which is longer than or equal to the calibration time period.

Returning to step 907, if the robot control system 110 determines that a total number of the captured calibration images within the captured image set has not reached the target count, the robot control system 110 attempts to detect an additional idle period during the robot operation at step 921. When the additional idle period is detected, the robot control system 110 captures one or more calibration images at one or more locations within the camera field of view 510 of the camera 570, and may add the captured calibration images to the captured image set.

At step 925, the robot control system 110 may again determine whether a total number of the captured calibration images within the captured image set has reached the defined target count. If the robot control system 110 at step 925 determines that total number of the captured calibration images within the captured image set has not reached the defined target count, the robot control system 110 can return to step 921 to wait for a subsequent idle period, in order to capture more calibration images. If the robot control system 110 at step 925 determines that the total number of the captured calibration images within the captured image set has reached the defined target count, the process can continue to step 915 and the robot control system 110 determines whether a remaining time in the additional idle period is longer than or equal to the defined calibration time period.

At step 915, if the robot control system 110 determines that the remaining time in the current idle period is longer than or equal to the defined calibration time period, the process can continue to step 919. At step 919, the robot control system 110 performs the additional camera calibration (e.g., second camera calibration).

After the robot control system 110 performs the additional calibration at step 919, the robot control system 110 at step 927 may determine the amount of deviation between the camera calibration information of the first camera calibration and the updated camera calibration information of the additional calibration, and determine whether the amount of deviation exceeds a defined threshold. If the amount of deviation exceeds the defined threshold, the robot control system 110 outputs a notification at step 929 (e.g., to user interface device 180). In some instances, the robot control system 110 may stop or pause the robot operation in response to such a determination. On the other hand, if the amount of deviation does not exceed the defined threshold, the robot control system 110 may reset the captured image set at step 932 and goes back to step 903 to detect an idle period to capture a new set of calibration images.

Figure 10:
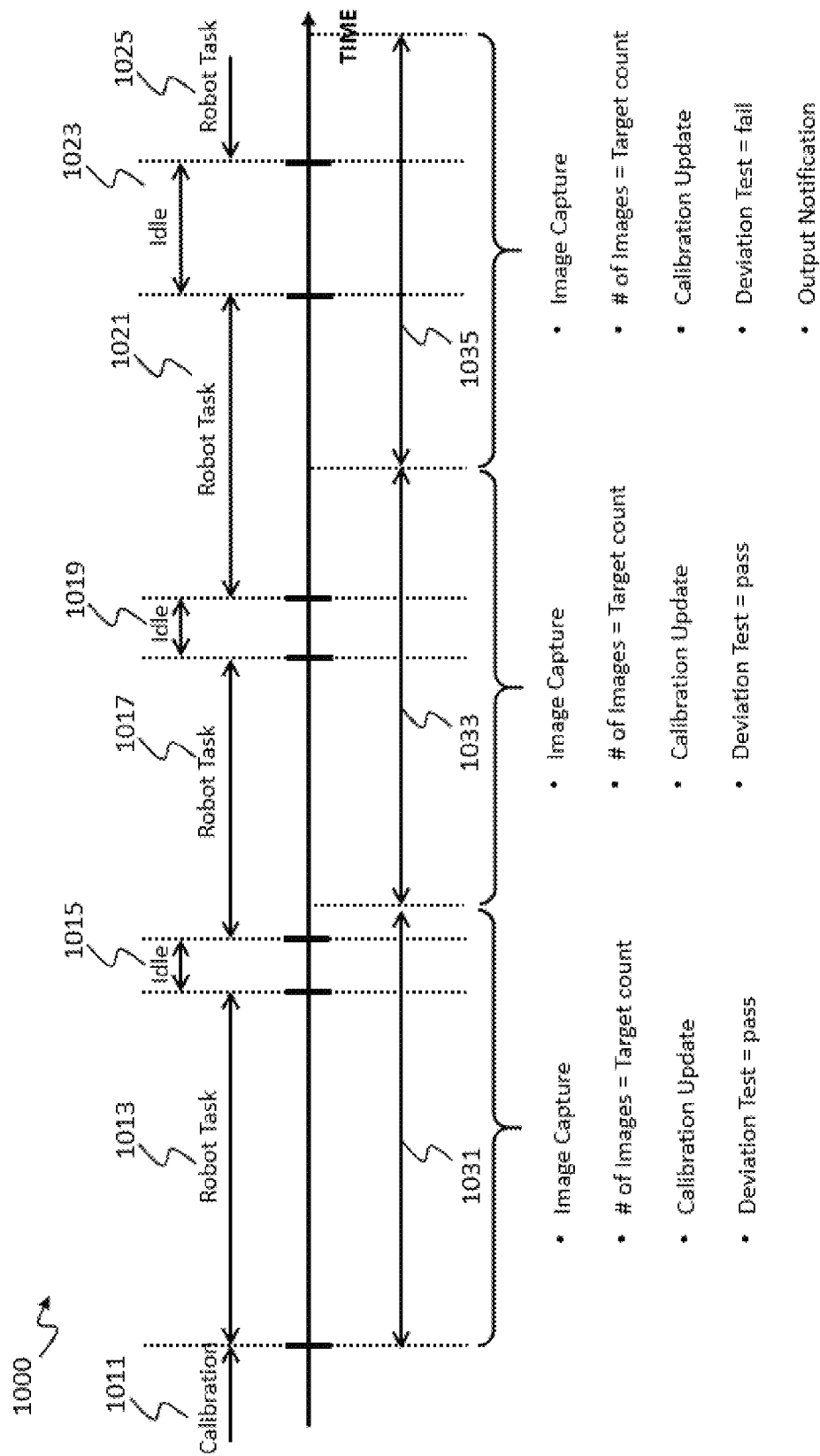
FIG. 10 depicts an example time line for performing and updating camera calibration, in which the camera calibration is performed in a robot task period, an idle period, or a combination thereof, according to an embodiment hereof.

As stated above with respect to FIGS. 6A and 6B, some embodiments of the present disclosure may allow the calibration images to be captured without the use of an idle period, or regardless of whether there is an idle period. FIG. 10 depicts an example time line 1000 for such an embodiment. The time line 1000 may reflect an example scenario for the system 600 of FIGS. 6A and 6B. The time line 1000 may begin with a calibration period 1011, which may occur before a robot operation begins. In the calibration period 1011, the robot control system 110 of FIG. 1A, 1, or 1C may perform the first camera calibration to determine camera calibration information for the camera 670 of FIG. 6A.

After the first camera calibration is complete, the robot operation begins with the task period 1013. During the robot operation, the robot control system 110 controls the robot 650 of FIGS. 6A and 6B to perform the robot tasks during the task periods 1013, 1017, 1021 and 1025, while the robot 650 is free from performing robot tasks during the idle periods 1015, 1019, 1023.

In the example time line 1000, the robot control system 110 does not need to wait for an idle period to capture the calibration images during the idle period. As discussed above, because the calibration pattern 620 of FIGS. 6A and 6B is placed on the robot 650 such that the calibration pattern 620 is regularly facing the camera 670 even while the robot 650 is performing a robot task, the robot control system 110 may capture calibration images any time during the robot operation. Thus, during the time period 1031, the robot control system 110 captures calibration images and adds the captured calibration images to a captured image set. The time period 1031 may include only a robot task period(s), only an idle period(s), or any combination thereof. If, during the time period 1031, the number of the captured calibration images in the captured image set reaches the defined target count, the robot control system 110 performs a second camera calibration to determine updated camera calibration information based on the captured calibration images. Further, the robot control system 110 may determine the amount of deviation between the camera calibration information from the first camera calibration and the updated camera calibration information from the second camera calibration. In this example, because the amount of deviation does not exceed the defined threshold, the robot control system 110 resets the captured image set by removing all calibration images in the captured image set, and continues to the time period 1033. In another embodiment, the robot control system 110 does not perform the reset in the time period 1031, such that the captured image set may act as a sliding window that uses a defined number of the most recently captured calibration images to perform a subsequent (e.g., third) camera calibration.

During the time period 1033, the robot control system 110 captures another set of calibration images and adds the captured calibration images to the captured image set. Like with the time period 1031, the time period 1033 may include only a robot task period(s), only an idle period(s), or any combination thereof. When the number of the captured calibration images in the captured image set reaches the defined target count, the robot control system 110 performs another (e.g., third) camera calibration to determine the updated camera calibration information based on the captured calibration images from the time period 1033. The robot control system 110 may determine the amount of deviation between the camera calibration information from the first camera calibration and the updated camera calibration information from the third camera calibration of the time period 1033. In this example, because the amount of deviation does not exceed the defined threshold, the robot control system 110 resets the captured image set by removing the calibration images in the captured image set, and continues to the time period 1035.

During the time period 1035, the robot control system 110 captures another set of calibration images and adds the captured calibration images to the captured image set. When the number of the captured calibration images in the captured image set reaches the defined target count, the robot control system 110 performs yet another (e.g., fourth) camera calibration to determine updated camera calibration information based on the captured calibration images. The robot control system 110 may determine the amount of deviation between the camera calibration information from the first camera calibration and the updated camera calibration information from the fourth camera calibration. In this example, because the amount of deviation exceeds the defined threshold, the robot control system 110 outputs the notification signal of the threshold being exceeded.

Figure 11:
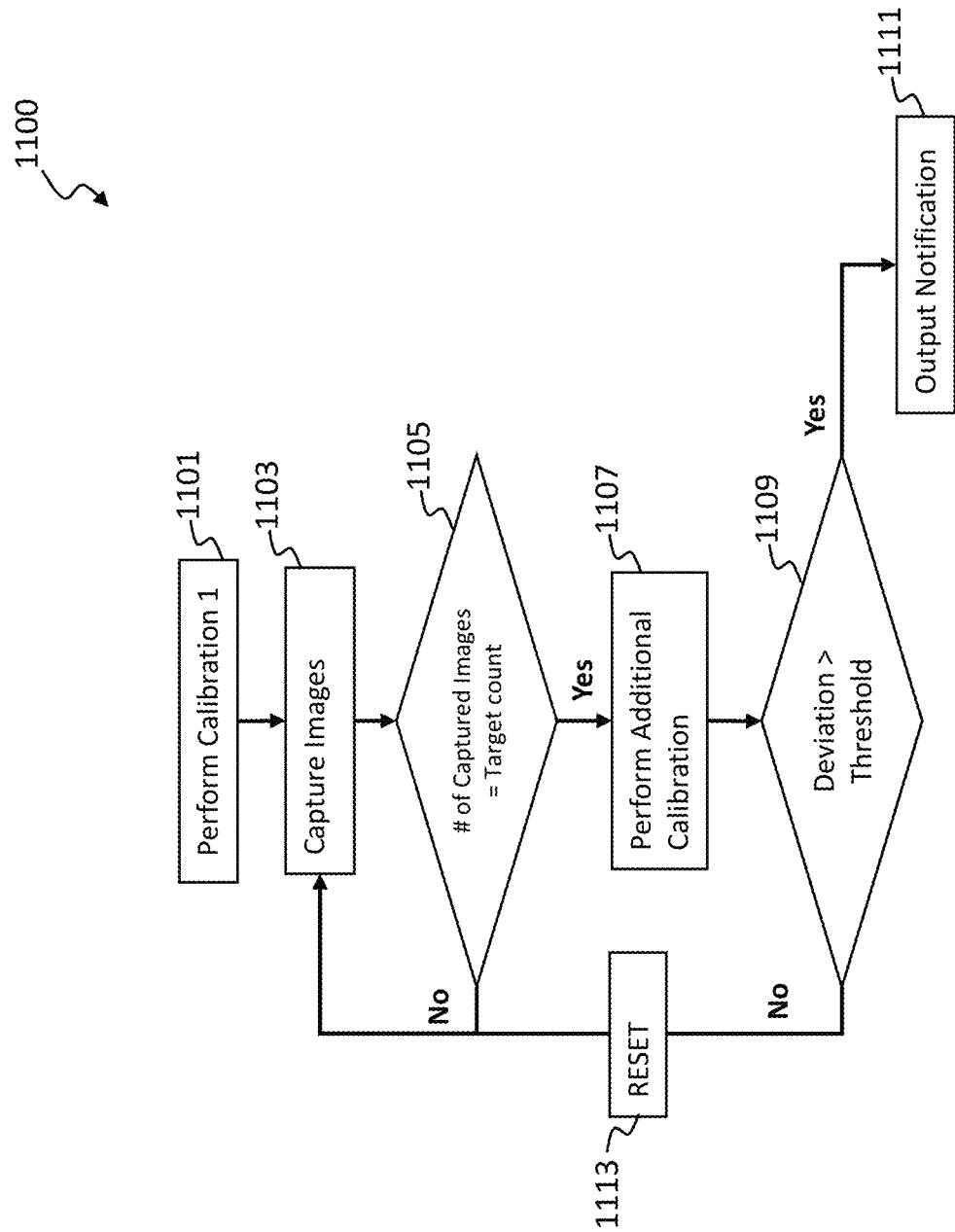
FIG. 11 depicts an example flow diagram for performing and updating camera calibration, in which the camera calibration is performed in a robot task period, an idle period, or a combination thereof, according to an embodiment hereof.

FIG. 11 depicts an example flow diagram 1100 that shows a camera calibration update process of the camera calibration relating to the processes discussed above for FIGS. 6A, 6B, and 10. At step 1101, the robot control system 110 of FIG. 1A, 1, or 1C performs a first camera calibration. At step 1103, the robot control system 110 controls the robot 650 of FIGS. 6A and 6B to move the calibration pattern 620 of FIGS. 6A and 6B and captures calibration images via the camera 670 of FIG. 6A at respective locations within the camera field of view 610 of FIGS. 6A and 6B of the camera 670. At step 1105, the robot control system 110 determines whether the number of the captured calibration images has reached the defined target count. If the number of the captured calibration images has not reached the defined target count, the process returns to step 1103 and the robot control system 110 continues to capture more calibration images at respective locations.

Continuing with step 1105, if the number of the captured calibration images has reached the target count, the process continues to step 1107 and the robot control system 110 performs an additional camera calibration (e.g., a second camera calibration) to determine updated camera calibration information. After the robot control system 110 performs the additional calibration at step 1107, the robot control system 110 at step 1109 determines the amount of deviation between the camera calibration information of the first camera calibration and the updated camera calibration information of the additional camera calibration and determines whether the amount of deviation exceeds a defined threshold. If the amount of deviation exceeds the defined threshold, the robot control system 110 outputs the notification signal at step 1111. In some cases, the robot control system 110 may stop or pause the robot operation in response to such a determination. On the other hand, if the amount of deviation does not exceed the defined threshold, the robot control system 110 may reset the captured calibration images at step 1113 and goes back to step 1103 to detect an idle period to capture new set of calibration images. In an embodiment, the reset step 1113 may be omitted.

Additional Discussion of Various Embodiments

Embodiment 1 relates to a robot control system comprising a communication interface configured to communicate with a robot having a base and a robot arm with a calibration pattern disposed thereon, and to communicate with a camera having a camera field of view. The robot control system further comprises a control circuit configured: a) to perform a first camera calibration to determine camera calibration information associated with the camera, b) to control, based on the camera calibration information, movement of the robot arm to perform a robot operation by outputting a first movement command that is based on the camera calibration information to the robot via the communication interface, c) to control the robot arm, after the first camera calibration, to move the calibration pattern to one or more locations within the camera field of view by outputting a second movement command to the robot via the communication interface, d) to receive one or more calibration images from the camera via the communication interface, wherein the one or more calibration images are respectively captured at the one or more locations, e) to add the one or more calibration images to a captured image set which includes calibration images, f) to perform a second camera calibration based on the calibration images in the captured image set, wherein the second camera calibration outputs updated camera calibration information, g) to determine a deviation between the camera calibration information and the updated camera calibration information, h) to determine whether the deviation exceeds a defined threshold, i) to output, in response to a determination that the deviation exceeds the defined threshold, a notification signal that indicates the deviation exceeds the defined threshold.

Embodiment 2 includes the robot control system of embodiment 1, wherein the second camera calibration is performed only when a total number of calibration images in the captured image set has reached a defined target count.

Embodiment 3 includes the robot control system of embodiment 1 or 2, wherein the control circuit is further configured to update the captured image set by adding a number of one or more calibration images that are most recently captured to the captured image set, and removing from the captured image set an equal number of one or more calibration images that were least recently captured, and wherein, when the second camera calibration is performed, a total number of calibration images in the captured image set is equal to a defined target count.

Embodiment 4 includes the robot control system of any one of embodiments 1-3, wherein the control circuit is further configured to detect an idle period during the robot operation, and to output the second movement command during the idle period such that the robot arm is controlled to move the calibration pattern to the one or more locations during the idle period, and wherein the one or more respective calibration images are captured at the one or more locations during the idle period.

Embodiment 5 includes the robot control system of embodiment 4, wherein the idle period is a first idle period, wherein the control circuit is further configured: a) to determine that a total number of calibration images in the captured image set has reached a defined target count, b) to detect, after the first idle period, a second idle period during the robot operation, c) to determine whether the second idle period is longer than or equal to a defined calibration time period, which indicates an amount of time necessary to complete the second camera calibration, d) in response to a determination that the second idle period is longer than or equal to the defined calibration time period, to perform the second camera calibration during the second idle period, e) in response to a determination that the second idle period is shorter than the defined calibration time period: a) to receive one or more additional calibration images from the camera via the communication interface during the second idle period, wherein the one or more additional calibration images are respectively captured at one or more additional locations within the camera field of view, b) to update the captured image set by adding the one or more additional images and by removing an equal number of one or more calibration images that were least recently captured so as to generate an updated captured image set, and c) to wait until a subsequent idle period that is longer than or equal to the defined calibration time period to complete the second camera calibration with the updated captured image set.

Embodiment 6 includes the robot control system of embodiment 4, wherein the idle period is a first idle period, wherein the control circuit is further configured: a) to determine, after the idle period, that a total number of calibration images in the captured image set has not reached a defined target count, b) to detect a second idle period that follows the first idle period, c) to receive one or more additional calibration images from the camera via the communication interface during the second idle period, wherein the one or more additional calibration images are respectively captured at one or more additional locations within the camera field of view, d) to add the one or more additional calibration images to the captured image set so as to generate an updated captured image set, e) to determine whether a total number of calibration images in the updated captured image set has reached the defined target count, f) in response to a determination that the total number of calibration images in the captured image set has reached the defined target count: to determine whether a remaining time in the second idle period is longer than or equal to a defined calibration time period which indicates an amount of time necessary to complete the second camera calibration, g) in response to a determination that the remaining time in the second idle period is longer than or equal to the defined calibration time period, to perform the second camera calibration during the remaining time in the second idle period.

Embodiment 7 includes the robot control system of embodiment 6, wherein the control circuit is further configured, in response to a determination that the remaining time in the second idle period is shorter than the defined calibration time period: a) to receive one or more subsequent additional calibration images from the camera via the communication interface during the remaining time in the second idle period, wherein the one or more subsequent additional calibration images are respectively captured at one or more subsequent additional locations within the camera field of view, b) to update the captured image set by adding the one or more subsequent additional calibration images and by removing an equal number of calibration images in the captured image set that were least recently captured, and c) to wait until a subsequent idle period that is longer than or equal to the defined calibration time period to complete the second camera calibration with the updated captured image set.

Embodiment 8 includes the robot control system of any one of embodiments 1-7, wherein the control circuit is further configured: a) to receive one or more additional calibration images from the camera via the communication interface and to add the one or more additional calibration images to the captured image set, wherein the one or more additional calibration images are respectively captured at one or more additional locations within the camera field of view, b) to determine, after each image of the one or more additional calibration images have been added to the captured image set, whether a total number of calibration images in the captured image set exceeds a defined target count, c) in response to a determination that the total number of calibration images in the captured image set exceeds the defined target count, to remove a least recently captured calibration image from the captured image set, wherein the second camera calibration is performed with all calibration images of the captured image set after the one or more additional images have been added to the captured image set.

Embodiment 9 includes the robot control system of any one of embodiments 1-8, wherein the camera calibration information and the updated camera calibration information include respective values for a calibration parameter.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A computing system comprising:
a communication interface configured to communicate with a robot having a calibration pattern disposed thereon, and
a control circuit configured:
to output one or more movement commands for causing at least a portion of the robot to move the calibration pattern to one or more locations based on calibration information,
to receive one or more calibration images representing the calibration pattern, and
to perform a calibration operation based on the one or more calibration images, wherein the calibration operation outputs updated calibration information.

2. The computing system of claim 1, wherein the control circuit is configured to determine a deviation between the calibration information and the updated calibration information based on a defined threshold.

3. The computing system of claim 2, wherein the control circuit is configured to determine the defined threshold based on a temperature of an environment of the computing system.

4. The computing system of claim 1, wherein the control circuit is further configured to add the one or more calibration images to a captured image set which includes calibration images,
wherein the calibration operation is performed based on the calibration images in the captured image set.

5. The computing system of claim 4, wherein the calibration operation is performed only when a total number of calibration images in the captured image set has reached a defined target count.

6. The computing system of claim 4, wherein the control circuit is further configured to update the captured image set by adding a number of one or more calibration images that are most recently captured to the captured image set, and removing from the captured image set an equal number of one or more calibration images that were least recently captured,
wherein, when the calibration operation is performed, a total number of calibration images in the captured image set is equal to a defined target count.

7. The computing system of claim 4, wherein the control circuit is further configured to detect an idle period, and to output at least one movement command of the one or more movement commands during the idle period such that the at least a portion of the robot is controlled to move the calibration pattern to one or more locations during the idle period, and
wherein the one or more respective calibration images are captured when the calibration pattern is at the one or more locations during the idle period.

8. The computing system of claim 7, wherein the idle period is a first idle period, wherein the control circuit is further configured:
to determine, during the first idle period, that a total number of calibration images in the captured image set has reached a defined target count,
in response to a determination that the total number of calibration images in the captured image set has reached the defined target count, to determine that a remaining time in the first idle period is shorter than a defined calibration time period, wherein the defined calibration time period indicates an amount of time necessary to complete the calibration operation,
to detect, after determining that the remaining time in the first idle period is shorter than the defined calibration time period and after the first idle period, a second idle period,
to determine whether the second idle period is longer than or equal to the defined calibration time period, and
in response to a determination that the second idle period is longer than or equal to the defined calibration time period, to perform the calibration operation during the second idle period.

9. The computing system of claim 7, wherein the idle period is a first idle period, wherein the control circuit is further configured:
to determine, after the first idle period, that a total number of calibration images in the captured image set has not reached a defined target count,
to detect, after determining that the total number of calibration images in the captured image set has not reached the defined target count, a second idle period that follows the first idle period,
to receive one or more additional calibration images during the second idle period, wherein the one or more additional calibration images are respectively captured when the calibration pattern is at one or more additional locations within a camera field of view,
to add the one or more additional calibration images to the captured image set so as to generate an updated captured image set,
to determine whether a total number of calibration images in the updated captured image set has reached the defined target count,
in response to a determination that the total number of calibration images in the updated captured image set has reached the defined target count: to determine whether a remaining time in the second idle period is longer than or equal to a defined calibration time period, wherein the defined calibration time period indicates an amount of time necessary to complete the calibration operation, and
in response to a determination that the remaining time in the second idle period is longer than or equal to the defined calibration time period, to perform the calibration operation during the remaining time in the second idle period.

10. The computing system of claim 9, wherein the control circuit is further configured, in response to a determination that the remaining time in the second idle period is shorter than the defined calibration time period: a) to receive one or more subsequent additional calibration images during the remaining time in the second idle period, wherein the one or more subsequent additional calibration images are respectively captured when the calibration pattern is at one or more subsequent additional locations within the camera field of view, b) to update the captured image set by adding the one or more subsequent additional calibration images to the captured image set and by removing an equal number of calibration images in the captured image set that were least recently captured, and c) to wait until a subsequent idle period that is longer than or equal to the defined calibration time period to complete the calibration operation with the updated captured image set.

11. The computing system of claim 4, wherein the control circuit is further configured:
to receive one or more additional calibration images and to add the one or more additional calibration images to the captured image set, wherein the one or more additional calibration images are respectively captured when the calibration pattern is at one or more additional locations within a camera field of view, to determine, after each image of the one or more additional calibration images have been added to the captured image set, whether a total number of calibration images in the captured image set exceeds a defined target count, in response to a determination that the total number of calibration images in the captured image set exceeds the defined target count, to remove a least recently captured calibration image from the captured image set, wherein the calibration operation is performed with all calibration images of the captured image set after the one or more additional calibration images have been added to the captured image set.

12. The computing system of claim 1, wherein the calibration information and the updated calibration information include respective values for a calibration parameter.

13. A method of updating camera calibration, the method comprising:

communicating, via a computing system, with a robot having a calibration pattern disposed thereon, outputting, by the computing system, one or more movement commands for causing at least a portion of the robot to move the calibration pattern to one or more locations based on calibration information, receiving, by the computing system, one or more calibration images representing the calibration pattern, and performing, by the computing system, a calibration operation based on the one or more calibration images, wherein the calibration operation outputs updated calibration information.

14. The method of claim 13, further comprising:

adding the one or more calibration images to a captured image set which includes calibration images, wherein the calibration operation is performed based on the calibration images in the captured image set.

15. The method of claim 14, further comprising:

updating the captured image set by adding a number of one or more calibration images that are most recently captured to the captured image set, and removing from the captured image set an equal number of one or more calibration images that were least recently captured, wherein, when the calibration operation is performed, a total number of calibration images in the captured image set is equal to a defined target count.

16. The method of claim 14, further comprising:

detecting an idle period during robot operation, wherein the outputting the one or more movement commands includes outputting at least one movement command of the one or more movement commands to the robot to cause the at least a portion of the robot to move the calibration pattern to one or more locations within a camera field of view during the idle period, and wherein the one or more respective calibration images are captured when the calibration pattern is at the one or more locations during the idle period.

17. The method of claim 16, wherein the idle period is a first idle period, wherein the method further comprises:

determining, during the first idle period, that a total number of calibration images in the captured image set has reached a defined target count, in response to a determination that the total number of calibration images in the captured image set has reached the defined target count, to determine that a remaining time in the first idle period is shorter than a defined calibration time period, wherein the defined calibration time period indicates an amount of time necessary to complete the calibration operation, detecting, after determining that the remaining time in the first idle period is shorter than the defined calibration time period and after the first idle period, a second idle period, determining whether the second idle period is longer than or equal to the defined calibration time period, in response to a determination that the second idle period is longer than or equal to the defined calibration time period, performing the calibration operation during the second idle period.

18. The method of claim 16, wherein the idle period is a first idle period, wherein the method further comprises:

determining, during the first idle period, that a total number of calibration images in the captured image set has reached a defined target count, detecting, after determining that the total number of calibration images in the captured image set has not reached the defined target count, a second idle period that follows the first idle period, determining whether the second idle period is longer than or equal to a defined calibration time period, wherein the defined calibration time period indicates an amount of time necessary to complete the calibration operation, and in response to a determination that the second idle period is shorter than the defined calibration time period: receiving one or more additional calibration images during the second idle period, wherein the one or more additional calibration images are respectively captured when the calibration pattern is at one or more additional locations within the camera field of view, updating the captured image set by adding the one or more additional calibration images and by removing an equal number of one or more calibration images that were least recently captured so as to generate an updated captured image set, and waiting until a subsequent idle period that is longer than or equal to the defined calibration time period to complete the calibration operation with the updated captured image set.

19. The method of claim 16, wherein the idle period is a first idle period, wherein the method further comprises:

determining, after the first idle period, that a total number of calibration images in the captured image set has not reached a defined target count, detecting, after determining that the total number of calibration images in the captured image set has not reached the defined target count, a second idle period that follows the first idle period, receiving one or more additional calibration images during the second idle period, wherein the one or more additional calibration images are respectively captured when the calibration pattern is at one or more additional locations within the camera field of view, adding the one or more additional calibration images to the captured image set so as to generate an updated captured image set, determining whether a total number of calibration images in the updated captured image set has reached the defined target count, in response to a determination that the total number of calibration images in the updated captured image set has reached the defined target count: determining whether a remaining time in the second idle period is longer than or equal to a defined calibration time period which indicates an amount of time necessary to complete the calibration operation, and in response to a determination that the remaining time in the second idle period is longer than or equal to the defined calibration time period, performing the calibration operation during the remaining time in the second idle period.

20. A non-transitory computer-readable medium having instructions stored thereon that, when executed by a control circuit of a computing system, the computing system comprising a communication interface configured to communicate with a robot having a calibration pattern disposed thereon, cause the control circuit:

to output one or more movement commands to the robot via the communication interface for causing at least a portion of the robot to move the calibration pattern to one or more locations based on a calibration information, to receive-one or more calibration images representing the calibration pattern, and to perform a calibration operation based on the one or more calibration images, wherein the calibration operation outputs updated calibration information.

* * * * *